US010099175B2

(12) United States Patent
Takahashi et al.

(10) Patent No.: US 10,099,175 B2
(45) Date of Patent: Oct. 16, 2018

(54) AMOUNT-OF-SEAWATER CONTROL DEVICE FOR SCRUBBER, AMOUNT-OF-SEAWATER CONTROL METHOD FOR SCRUBBER, AND AMOUNT-OF-ALKALI CONTROL DEVICE

(71) Applicant: FUJI ELECTRIC CO., LTD., Kawasaki-shi (JP)

(72) Inventors: Kuniyuki Takahashi, Hino (JP); Takashi Inui, Hachioji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 54 days.

(21) Appl. No.: 15/205,431

(22) Filed: Jul. 8, 2016

(65) Prior Publication Data

US 2016/0317968 A1  Nov. 3, 2016

Related U.S. Application Data

(63) Continuation of application No. PCT/JP2014/069136, filed on Jul. 18, 2014.

(51) Int. Cl.
*B01D 53/14* (2006.01)
*B01D 53/34* (2006.01)
(Continued)

(52) U.S. Cl.
CPC ....... *B01D 53/346* (2013.01); *B01D 53/1412* (2013.01); *B01D 53/1481* (2013.01);
(Continued)

(58) Field of Classification Search
CPC ............... B01D 53/78; B01D 53/1481; B01D 2252/1035; B01D 2259/4566;
(Continued)

(56) References Cited

U.S. PATENT DOCUMENTS 5,690,899 A  11/1997  Makkinejad et al.
2005/0123408 A1*  6/2005  Koehl ................. F04D 15/0088
417/53

(Continued)

FOREIGN PATENT DOCUMENTS

EP  0756890 A2  2/1997
EP  2295130 A1  3/2011
(Continued)

*Primary Examiner* — Amber R Orlando
*Assistant Examiner* — Syed T Iqbal
(74) *Attorney, Agent, or Firm* — Rabin & Berdo, P.C.

(57) ABSTRACT

A control device for a scrubber includes a converter which calculates a minimum amount of seawater: a minimum amount of seawater necessary for an absorption reaction of the sulfur oxide by the seawater, from an engine output and a sulfur content of fuel oil; another converter which calculates a corrected amount of seawater: an amount of seawater at which the sulfur oxide in the exhaust gas discharged from the scrubber is equal to or less than a set value; a summing element which calculates a set amount of seawater by summing the minimum amount and corrected amount of seawater; a pump control device which implements control such that seawater corresponding to the set amount is supplied to the scrubber; and an alkalinity setting device which sets the alkalinity of the seawater in accordance with traveled waters. The amount of seawater supplied to the scrubber is adjusted based on the alkalinity.

20 Claims, 11 Drawing Sheets

(51) Int. Cl.
    *B01D 53/50*     (2006.01)
    *B01D 53/78*     (2006.01)
    *B01D 53/92*     (2006.01)
    *F23J 15/04*     (2006.01)
    *F01N 3/04*     (2006.01)
    *B01D 53/30*     (2006.01)

(52) U.S. Cl.
    CPC ........... *B01D 53/30* (2013.01); *B01D 53/501* (2013.01); *B01D 53/504* (2013.01); *B01D 53/507* (2013.01); *B01D 53/78* (2013.01); *B01D 53/92* (2013.01); *F01N 3/04* (2013.01); *F23J 15/04* (2013.01); *B01D 53/502* (2013.01); *B01D 2251/304* (2013.01); *B01D 2251/604* (2013.01); *B01D 2252/1035* (2013.01); *B01D 2257/302* (2013.01); *B01D 2258/01* (2013.01); *B01D 2259/4566* (2013.01); *F01N 2570/04* (2013.01); *F01N 2590/02* (2013.01); *F23J 2215/20* (2013.01); *F23J 2219/40* (2013.01); *F23J 2900/15041* (2013.01); *Y02T 10/20* (2013.01)

(58) Field of Classification Search
    CPC .............. B01D 2258/01; B01D 53/504; B01D 53/502; B01D 2251/604; B01D 53/1412; B01D 53/92; B01D 53/346; F23J 2900/15041; F23J 2219/40; F23J 2215/20; F23J 15/04; F01N 3/04; F01N 2590/02; F01N 2570/04
    See application file for complete search history.

(56) References Cited

U.S. PATENT DOCUMENTS

2010/0206171 A1*   8/2010   Peng ................. B01D 53/1481
                                                                                                    96/235
2015/0209720 A1   7/2015   Komatsu et al.

FOREIGN PATENT DOCUMENTS

| EP | 2574393 A1 | 4/2013 |
|---|---|---|
| JP | H03-288523 A | 12/1991 |
| JP | H09-173769 A | 7/1997 |
| JP | H11244646 A | 9/1999 |
| JP | 2993891 B2 | 12/1999 |
| JP | 2004-081933 A | 3/2004 |
| JP | 2005-066505 A | 3/2005 |
| JP | 2007-051555 A | 3/2007 |
| JP | 2011-524800 A | 9/2011 |
| JP | 2012-179521 A | 9/2012 |
| WO | WO 2012-117586 A1 | 9/2012 |
| WO | WO-2014/119513 A1 | 8/2014 |

\* cited by examiner

FIG. 2

Table 1.  Reference Composition

|  | MOL RATIO X 10$^7$ | ATOMIC WEIGHT / MOLECULAR WEIGHT | MASS (g) | KCl-normalized (g) |
|---|---|---|---|---|
| Na$^+$ | 4188071 | 22.98976928 | 9.6282786 | 10.78145 |
| Mg$^{2+}$ | 471678 | 24.30500000 | 1.1464134 | 1.28372 |
| Ca$^{2+}$ | 91823 | 40.07800000 | 0.3680082 | 0.41208 |
| K$^+$ | 91159 | 39.09830000 | 0.3564162 | 0.39910 |
| Sr$^{2+}$ | 810 | 87.62000000 | 0.0070972 | 0.00795 |
| Cl$^-$ | 4874839 | 35.45300000 | 17.2827667 | 19.35271 |
| SO$_4^{2-}$ | 252152 | 96.06260000 | 2.4222377 | 2.71235 |
| HCO$_3^-$ | 15340 | 61.01684000 | 0.0935998 | 0.10481 |
| Br$^-$ | 7520 | 79.90400000 | 0.0600878 | 0.06728 |
| CO$_3^{2-}$ | 2134 | 60.00890000 | 0.0128059 | 0.01434 |
| B(OH)$_4^-$ | 900 | 78.84036000 | 0.0070956 | 0.00795 |
| F$^-$ | 610 | 18.99840320 | 0.0011589 | 0.00130 |
| OH$^-$ | 71 | 17.00734000 | 0.0001208 | 0.00014 |
| B(OH)$_3$ | 2807 | 61.83302000 | 0.0173565 | 0.01944 |
| CO$_2$ | 86 | 44.00950000 | 0.0003785 | 0.00042 |
| TOTAL |  |  | 31.4038218 | 35.16504 |

AMOUNT-OF-SEAWATER CONTROL DEVICE FOR SCRUBBER, AMOUNT-OF-SEAWATER CONTROL METHOD FOR SCRUBBER, AND AMOUNT-OF-ALKALI CONTROL DEVICE

TECHNICAL FIELD

The present invention relates to an amount-of-seawater control device, an amount-of-seawater control method and an amount-of-alkali control device, for seawater which is supplied as an absorbing liquid to a scrubber for reducing the concentration of sulfur oxides in the exhaust gas (in particular, sulfur dioxide ($SO_2$)).

BACKGROUND ART

The International Maritime Organization (IMO) has a policy of incrementally strengthening sulfur concentration restrictions in fuel oil in order to reduce sulfur oxides (SOx) contained in the exhaust gases of ships, and intends to finally impose a restriction of no more than 0.5% sulfur concentration, applicable to all sea areas. Therefore, ship operators need to take measures such as using low-sulfur-content fuel, or installing an exhaust gas processing device in the main engine.

A scrubber which reduces the concentration of harmful material in the exhaust gas by passing the exhaust gas through seawater is known as an exhaust gas processing device for a ship (see, for example, PTL 1 and PTL 2).

CITATION LIST

Patent Literature

[PTL 1] Japanese Patent Application Publication No. 2004-081933
[PTL 2] Japanese Patent No. 2993891

As regards the amount of sea water supplied to the scrubber, an amount of seawater suited to the amount of sulfur oxide to be treated must be injected, and if an excessive amount of seawater is supplied, then there is a problem in that the pressure loss becomes greater, and the drive power of the seawater pump increases, whereas if the amount of seawater is insufficient, then there is a problem in that the concentration of sulfur oxides in the exhaust gas exceeds the limit value.

Furthermore, in the exhaust gas processing device disclosed in PTL 2, pH control is applied to the liquid bottoms of an absorption tower constituting a scrubber, and the exhaust gas is cleaned by recycling cleaning liquid from the bottom of the absorption tower. A glass electrode type of meter is generally used as a pH meter for pH measurement. PM (smoke), etc. is mixed into the liquid bottoms after cleaning of the exhaust gas by the scrubber and soils the electrodes of the pH meter which measures the liquid bottoms, and consequently there is a problem in that frequent maintenance, such as cleaning, is required.

SUMMARY OF INVENTION

Technical Problem

The present invention was devised in view of these circumstances, an object thereof being to provide an amount-of-seawater control device for a scrubber, an amount-of-seawater control method for a scrubber, and an amount-of-alkali control device, whereby stable operation can be achieved by supplying an appropriate amount of seawater to a scrubber in such a manner that the sulfur oxide concentration in the exhaust gas after processing does not exceed a limit value, and the frequency of measurement of the alkalinity can be reduced.

Solution to Problem

The amount-of-seawater control device for a scrubber according to the present invention is an amount-of-seawater control device for a scrubber which controls an amount of seawater supplied to a scrubber that cleans sulfur oxide contained in exhaust gas by bringing the sulfur oxide into contact with seawater, the amount-of-seawater control device comprising: a minimum-amount-of-seawater converter which calculates a minimum amount of seawater which is a minimum amount of seawater necessary for an absorption reaction of the sulfur oxide by the seawater, from an engine output, a sulfur content of fuel oil and the alkalinity of the seawater; an amount-of-seawater correction converter which calculates a corrected amount of seawater which is an amount of seawater at which the sulfur oxide contained in the exhaust gas discharged into atmosphere from the scrubber is equal to or less than a set value; a summing element which calculates a set amount of seawater by summing the minimum amount of seawater and the corrected amount of seawater; a pump control device which implements control such that seawater corresponding to the set seawater amount is supplied to the scrubber; and an alkalinity setting device which sets the alkalinity of the seawater in accordance with traveled waters, wherein the minimum-amount-of-seawater converter adjusts the amount of seawater supplied to the scrubber on the basis of the alkalinity corresponding to the traveled waters.

According to the amount-of-seawater control device for a scrubber described above, the alkali content required to absorb the sulfur oxides contained in the consumed heavy oil is calculated as a minimum amount of seawater, from the engine output and the sulfur content in the heavy oil used, and moreover, a corrected amount of seawater is calculated in such a manner that the sulfur oxide concentration contained in the processed exhaust gas which is discharged into the atmosphere from the scrubber does not exceed the emission limit value, and a set amount of seawater obtained by summing together these two amounts is supplied to the scrubber. By this configuration, it is possible to achieve stable operation by supplying an appropriate amount of seawater to the scrubber in such a manner that the sulfur oxide concentration in the exhaust gas after processing does not exceed the limit value, without the amount of seawater supplied to the scrubber being excessive or insufficient. Moreover, since the alkalinity of the seawater is set in accordance with the traveled waters, and the amount of seawater supplied to the scrubber is adjusted on the basis of this alkalinity, then it is possible to set the amount of seawater supplied to the scrubber more appropriately. Furthermore, since the alkalinity of the seawater can be set in accordance with the traveled waters, then it is possible to omit pH measurement of the seawater in the traveled waters. Consequently, pH measurement can be omitted in all or a portion of the traveled waters, the frequency of measurement of the pH of the seawater is reduced, and the burden of cleaning the pH meter, and the like, can be reduced.

The amount-of-seawater control method for a scrubber according to the present invention is an amount-of-seawater control method for a scrubber which controls an amount of seawater supplied to a scrubber that cleans sulfur oxide contained in exhaust gas by bringing the sulfur oxide into contact with seawater, the amount-of-seawater control method comprising the steps of: calculating a minimum amount of seawater which is a minimum amount of seawater necessary for an absorption reaction of the sulfur oxide by the seawater, from an engine output, a sulfur content of fuel oil and the alkalinity of the seawater that corresponds to traveled waters; calculating a corrected amount of seawater which is an amount of seawater at which the sulfur oxide contained in the exhaust gas discharged into atmosphere from the scrubber is equal to or less than a set value; calculating a set amount of seawater by summing the minimum amount of seawater and the corrected amount of seawater, and implementing control so as to supply seawater corresponding to the set amount of seawater, to the scrubber.

The amount-of-alkali control device according to the present invention is an amount-of-alkali control device for a scrubber which controls an amount of alkali injected into seawater supplied to a scrubber that cleans sulfur oxide contained in exhaust gas by bringing the sulfur oxide into contact with seawater, the amount-of-alkali control device comprising: a minimum-amount-of-seawater converter which calculates a minimum amount of seawater which is a minimum amount of seawater necessary for an absorption reaction of the sulfur oxide by the seawater, from an engine output, a sulfur content of fuel oil and the alkalinity of the seawater; an amount-of-seawater correction converter which calculates a corrected amount of seawater which is an amount of seawater at which the sulfur oxide contained in the exhaust gas discharged into atmosphere from the scrubber is equal to or less than a set value; a summing element which calculates a set amount of seawater by summing the minimum amount of seawater and the corrected amount of seawater; a pump control device which implements control such that seawater corresponding to the set seawater amount is supplied to the scrubber; an alkalinity setting device which sets the alkalinity of the seawater in accordance with traveled waters; an amount-of-alkali calculator which calculates an alkali injection amount from an alkali content contained in seawater corresponding to the set amount of seawater; and an alkali pump control device which implements control such that an alkali agent corresponding to the alkali injection amount is injected into the seawater supplied to the scrubber, wherein the amount-of-alkali calculator adjusts the alkali injection amount on the basis of the alkalinity corresponding to the traveled waters.

According to the amount-of-alkali control device described above, the alkali content required to neutralize the sulfur oxides contained in the consumed heavy oil is calculated as a minimum amount of seawater, from the engine output and the sulfur content in the heavy oil used, and moreover, a corrected amount of seawater is calculated in such a manner that the sulfur oxide concentration contained in the processed exhaust gas which is discharged into the atmosphere from the scrubber does not exceed the emission limit value, and an alkali injection amount to be injected into the seawater is calculated on the basis of a set amount of seawater obtained by summing together the minimum amount of seawater and the corrected amount of seawater. Moreover, since the alkalinity of the seawater is set in accordance with the traveled waters, and the alkali injection amount supplied to the scrubber is adjusted on the basis of this alkalinity, then it is possible to set the amount of seawater supplied to the scrubber more appropriately. Furthermore, since the alkalinity of the seawater can be set in accordance with the traveled waters, then it is possible to omit pH measurement of the seawater in the traveled waters. Consequently, pH measurement can be omitted in all or a portion of the traveled waters, the frequency of measurement of the pH of the seawater is reduced, and the burden of cleaning the pH meter, and the like, can be reduced.

Advantageous Effects of Invention

According to the present invention, it is possible to achieve stable operation by supplying an appropriate amount of seawater to the scrubber in such a manner that the sulfur oxide concentration in the exhaust gas after processing does not exceed a limit value, and to reduce the measurement frequency of the alkalinity.

BRIEF DESCRIPTION OF DRAWINGS

FIG. 2 is a table showing a standard composition of seawater.

DESCRIPTION OF EMBODIMENTS

Figure 1:
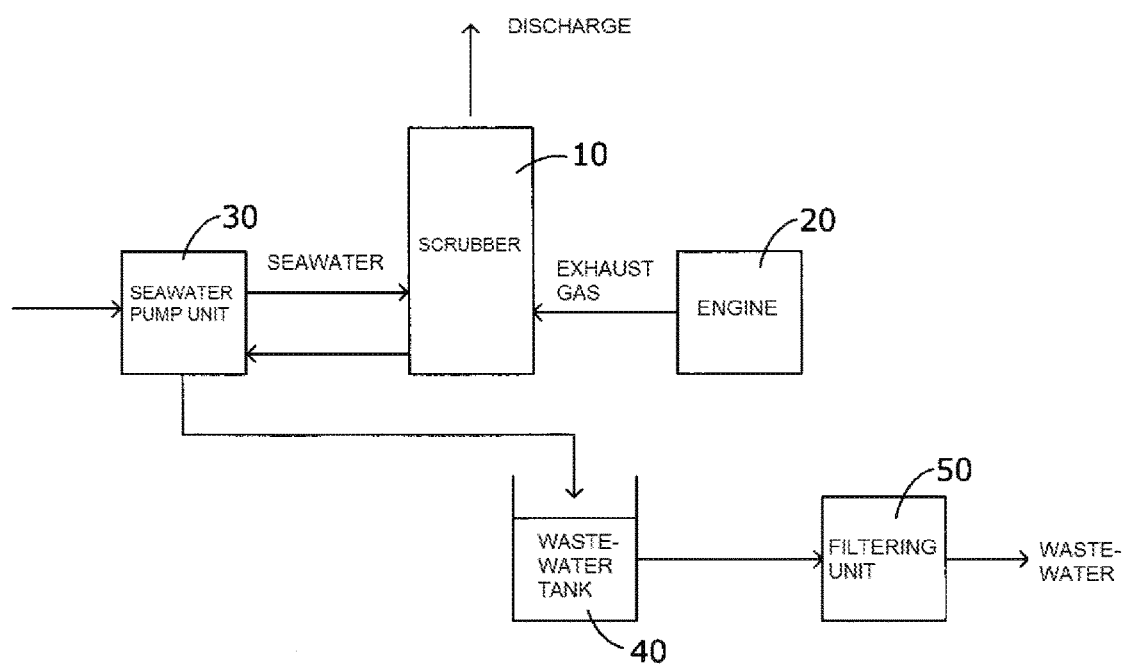
FIG. 1 is an illustrative diagram showing an exhaust gas processing system centered on a scrubber according to a first embodiment.

Below, a first embodiment of the present invention is described in detail with reference to the accompanying drawings. FIG. 1 is an illustrative diagram showing an exhaust gas processing system centered on a scrubber according to a first embodiment. The exhaust gas processing system according to the first embodiment contemplates a system which removes sulfur dioxide ($SO_2$) included in exhaust gas emitted from an engine which is used in a ship. The invention is not limited to this, however, and the exhaust gas processing system according to the present embodiment can be applied to processing of various exhaust gases including substances such as nitrogen oxide (NOx), sulfur oxide (SOx), and the like.

As shown in FIG. 1, the exhaust gas processing system is principally composed by a scrubber 10 which receives a supply of exhaust gas from the engine 20, a seawater pump unit 30 provided with a seawater pressurization pump and a seawater suction pump, a wastewater tank 40, and a filtering unit 50 for filtering the wastewater.

The exhaust gas emitted from the engine 20 is introduced into the scrubber 10. This exhaust gas contains 50 to 1500 ppm of sulfur dioxide ($SO_2$). As this exhaust gas rises up inside the scrubber 10, seawater that has been introduced into the scrubber 10 is introduced via the seawater pump unit 30, and a gas-liquid contact is created.

The sulfur dioxide ($SO_2$) in the exhaust gas is dissolved in the seawater and separated into hydrogen ions and sulfurous acid ions, as shown in Formula (1) below.
[C1]

$$SO_2 + H_2O \rightarrow H^+ + HSO_3^- \quad (1)$$

The hydrogen ions react with the alkali component ($NaHCO_2$) in the seawater, as indicated in Formula (2) below.
[C2]

$$H^+ + HSO_3^- + Na^+ + HCO_3^- \rightarrow Na^+ + HSO_3^- + H_2O + CO_2 \quad (2)$$

The sulfurous acid ions are oxidized to become sulfuric acid ions by air, as indicated in Formula (3) below.
[C3]

$$Na^+ + HSO_3^- {}^+ Na^+ + HCO_3^- + \tfrac{1}{2}O_2 \rightarrow 2Na^+ + SO_4^{2-} + H_2O + CO_2 \quad (3)$$

If the alkali component in the seawater required for the reactions in Formulas (2) and (3) is insufficient, then the hydrogen ion index (pH) in the seawater falls due to increase in the hydrogen ions, and the absorption reaction of the sulfurous acid ions is impeded. Consequently, the minimum amount of seawater required for the absorption reaction of the sulfur dioxide ($SO_2$) by the seawater is determined by the amount which satisfies the reactive component with the alkali component indicated in Formulas (2) and (3). The exhaust gas from which the sulfur dioxide ($SO_2$) has been removed in this way is discharged into the atmosphere from the top of the scrubber 10.

The seawater sprayed inside the scrubber 10 drops down under gravity along the inner circumferential surface of the scrubber 10, and collects in a collecting section below the scrubber 10. The collected seawater is discharged to the wastewater tank 40 via the seawater pump unit 30, and is then filtered by the filtering unit 50 and discharged into the sea. In the filtering unit 50, it is possible to measure the pH of the seawater that is discharged.

Here, the method of calculating the alkalinity of the seawater (the term alkalinity being used to include the overall alkalinity and M alkalinity; same applies below) is described below with reference to FIG. 2. FIG. 2 is a table showing a standard composition of seawater, which is cited from Table 1 in TEOS-10 (Thermodynamic Equation Of Seawater 2010). The composition is not restricted in particular to the table, but in the present embodiment, when calculating the alkalinity of the seawater, the composition and masses (g) shown in Table 1 in FIG. 2 are used.

From the total value of the masses (g) in FIG. 2, the total amount of salts per 1 kg of seawater is 31.4 g/kg. Furthermore, the molecular weight of $HCO_{3-}$ and the molecular weight of $CaCO_3$ are respectively calculated as indicated below.

Molecular weight of $HCO_{3-}$=1.008+12.01+16.00×3=61.018

Molecular weight of $CaCO_3$=40.08+12.01+16.00×3=100.09

Next, the total amount of alkali ($HCO_{3-}$, $CO_3^{2-}$, $B(OH)_{4-}$, $OH_-$) that reacts with the $SO_2$, per 1 kg of seawater, is calculated as indicated below from the equivalent amount of alkali component in FIG. 2, by $HCO_{3-}$ conversion.

(15340+2134×2+900+71)/10000000×61.018×1000=125.5689≅125.6 mg/kg

Figure 3:
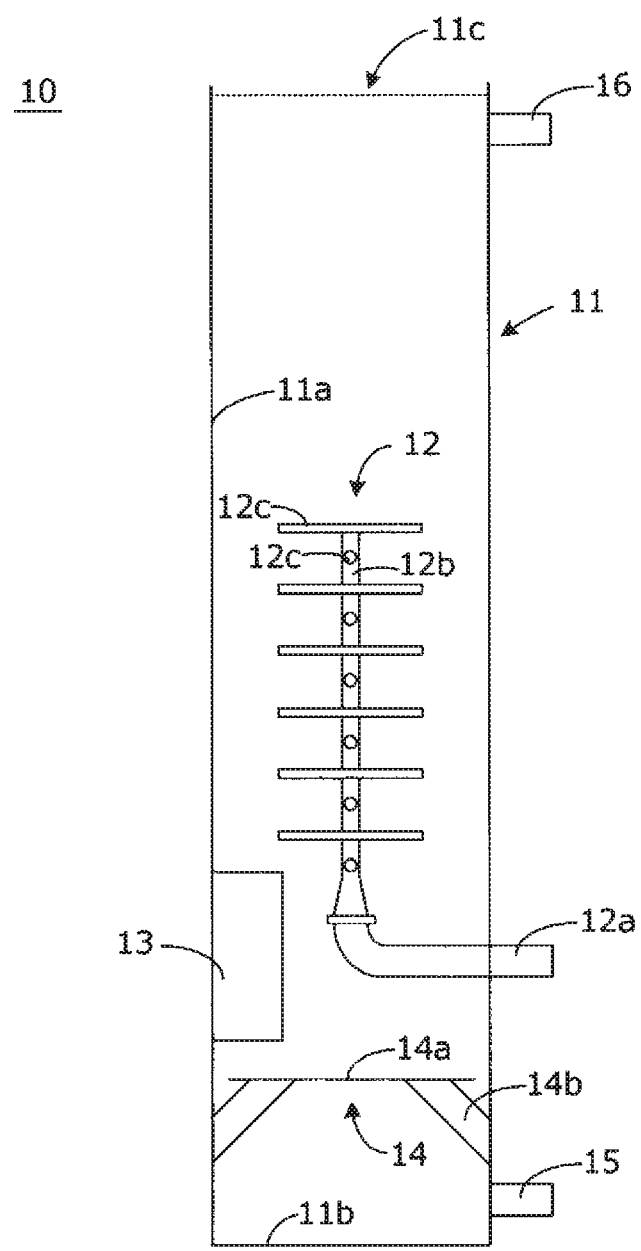
FIG. 3 is a cross-sectional schematic drawing of a scrubber.

The density of seawater is taken to be 1.024 kg/l. The alkalinity of seawater by $CaCO_3$ conversion is calculated as indicated below from the respective calculation results indicated above, and the density of seawater. Alkalinity of seawater by $CaCO_3$ conversion=125.6×1.024×(100.09/2)/61.018=105.49≅105 mg/l Next, the configuration of the scrubber 10 will be described. FIG. 3 is a cross-sectional schematic drawing showing an example of a scrubber 10.

As shown in FIG. 3, the scrubber 10 is provided with: a scrubber main body 11 having an internal space in the vertical direction; a spray apparatus 12 which injects (sprays) seawater (liquid) in the form of a mist in a prescribed region in the vertical direction of the internal space of the scrubber main body 11; a gas supply apparatus 13 which introduces engine exhaust gas (gas) into the scrubber main body 11 from a position below the region where the spray apparatus 12 sprays seawater; and a baffle 14 which is provided at a position below the spray apparatus 12. Here, the spray apparatus 12 is connected to the seawater pump unit shown in FIG. 1, and the gas supply apparatus 13 is connected to the engine 20 shown in FIG. 1.

The scrubber main body 11 is constituted by a round cylindrical perimeter wall section 11a and a circular bottom wall section 11b. The perimeter wall section 11a is formed with the same diameter in all parts. The upper end portion of the perimeter wall section 11a is open, and an opening section 11c is formed therein. In the present embodiment, the scrubber main body 11 has a round cylindrical shape, but the shape of the scrubber main body 11 is not limited to this and may be a square cylinder shape, for example.

The spray apparatus 12 is disposed on the central axis of the scrubber main body 11. The spray apparatus 12 is constituted by a water supply pipe 12a which is inserted inside the scrubber main body 11 from outside the scrubber main body 11 and which extends to a central position of the scrubber main body 11, a water conduit pipe 12b forming a trunk pipe which is coupled to the inserted end portion of the water supply pipe 12a and extends to a prescribed region, in the up/down direction, of the internal space of the scrubber main body 11, branch pipes 12c which are coupled to the water conduit pipe 12b and extend toward the perimeter wall section 11a of the scrubber main body 11, and spray nozzles (not illustrated) which are provided respectively at the front end of the each branch pipes 12c and which spray liquid supplied from the branch pipes 12c in a prescribed region. The branch pipes 12c are disposed in a plurality of levels in the up/down direction, and are also arranged so that branch pipes 12c that are mutually adjacent in the up/down direction intersect with each other.

The gas supply apparatus 13 is provided in such a manner that the gas spraying direction is aligned with the tangential direction of the perimeter wall section 11a of the scrubber main body 11. Consequently, the exhaust gas introduced from the gas supply apparatus 13 is sprayed in a horizontal direction along the inner circumferential surface of the perimeter wall section 11a.

The baffle 14 is constituted by a circular disk section 14a, and leg sections 14b which couple the circular disk section 14a with the perimeter wall section 11a of the scrubber main body 11. A gap for liquid droplets to flow through is formed between the outer circumferential portion of the circular disk section 14a and the perimeter wall section 11a of the scrubber main body 11. The baffle 14 divides the interior of the scrubber main body 11 into a region where liquid is sprayed by the spray apparatus 12 and a region where liquid is collected for drainage to the outside of the scrubber main body 11. A wastewater pipe 15 for discharging liquid to outside the scrubber main body 11 is provided below the baffle 14.

An exhaust pipe 16 for extracting a portion of the processed exhaust gas to the exterior of the scrubber main body 11 is provided in the vicinity of the opening section 11c of the scrubber main body 11. The exhaust pipe 16 is connected to an analyzer for sampling the processed exhaust gas.

The exhaust gas processing in the scrubber 10 which is composed in this way will now be described. Exhaust gas discharged from an engine is introduced by the gas supply apparatus 13 at a position below the region where the spray apparatus 12 sprays liquid. This exhaust gas rises up inside the scrubber main body 11 while revolving so as to follow the perimeter wall section 11a.

Meanwhile, seawater is introduced into the water conduit pipe 12b via the water supply pipe 12a. The seawater is then sprayed towards the perimeter wall section 11a of the scrubber main body 11, from the spray nozzles which are provided at the front ends of the plurality of levels of branch pipes 12c.

Consequently, the exhaust gas which rises up while revolving inside the scrubber main body 11 makes gas/liquid contact with the seawater sprayed from the spray nozzles provided on the branch pipes 12c which are provided in the respective levels, and the sulfur dioxide ($SO_2$) in the exhaust gas is absorbed and removed. The exhaust gas from which the sulfur dioxide ($SO_2$) has been removed is discharged into the atmosphere from the opening section 11c provided in the upper portion of the scrubber main body 11. Furthermore, a portion of the exhaust gas is sent to an analyzer via the exhaust pipe 16.

The seawater which forms into liquid droplets is pressed against the perimeter wall section 11a by the centrifugal force of the revolving flow and falls under its own weight. The droplets that drop down are prevented from revolving by the baffle 14 which is disposed below the scrubber main body 11, and then pass along the baffle 14 and the perimeter wall section 11a, and collect in the collecting section which is constituted by the bottom wall section 11b and the perimeter wall section 11a peripheral to same, of the scrubber main body 11. The collected liquid is discharged to the outside of the scrubber main body 11 via the wastewater pipe 15.

Figure 4:
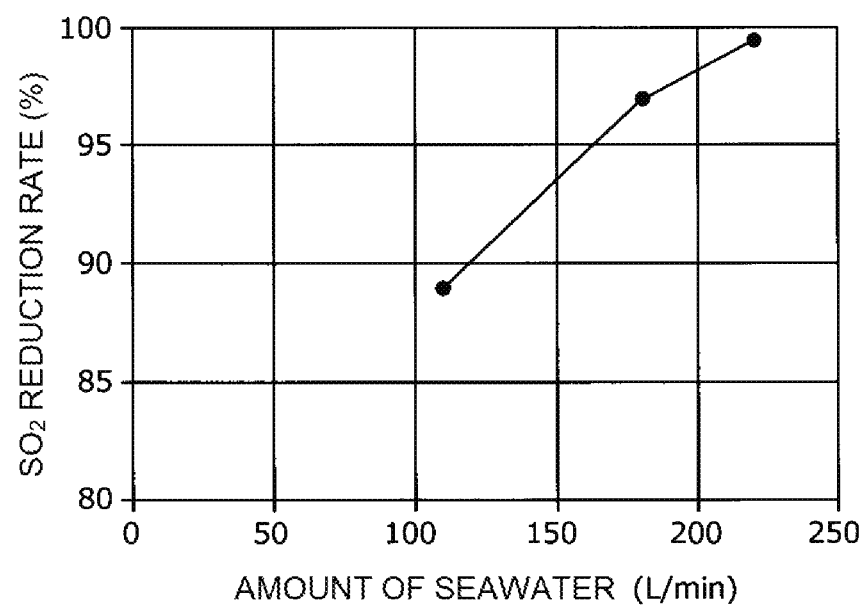
FIG. 4 is a graph showing the relationship between the amount of seawater supplied to the scrubber and the rate of removal of the sulfur dioxide ($SO_2$).

FIG. 4 is a graph showing the relationship between the amount of seawater supplied to the scrubber 10 and the rate of removal of the sulfur dioxide ($SO_2$). In FIG. 4, the horizontal axis indicates the amount of seawater (liters/min) and the vertical axis indicates the rate of removal of sulfur dioxide (%).

As shown in FIG. 4, the further the amount of seawater supplied to the scrubber 10 is raised and the greater the amount of seawater sprayed by the spray apparatus 12, the greater the increase in the rate of removal of the sulfur dioxide ($SO_2$). This is because the surface area of the liquid droplets increases when the sprayed amount of seawater is increased, and hence the contact surface area between the exhaust gas and the seawater becomes greater.

Due to the relationship between the amount of seawater and the rate of removal of sulfur dioxide ($SO_2$) shown in FIG. 4, when the exhaust gas which is discharged into the atmosphere from the opening section 11c of the scrubber main body 11 contains a high concentration of sulfur dioxide ($SO_2$) (high outlet $SO_2$ concentration), then it is possible to reduce the outlet $SO_2$ concentration by increasing the amount of seawater sprayed by the spray apparatus 12.

Figure 5:
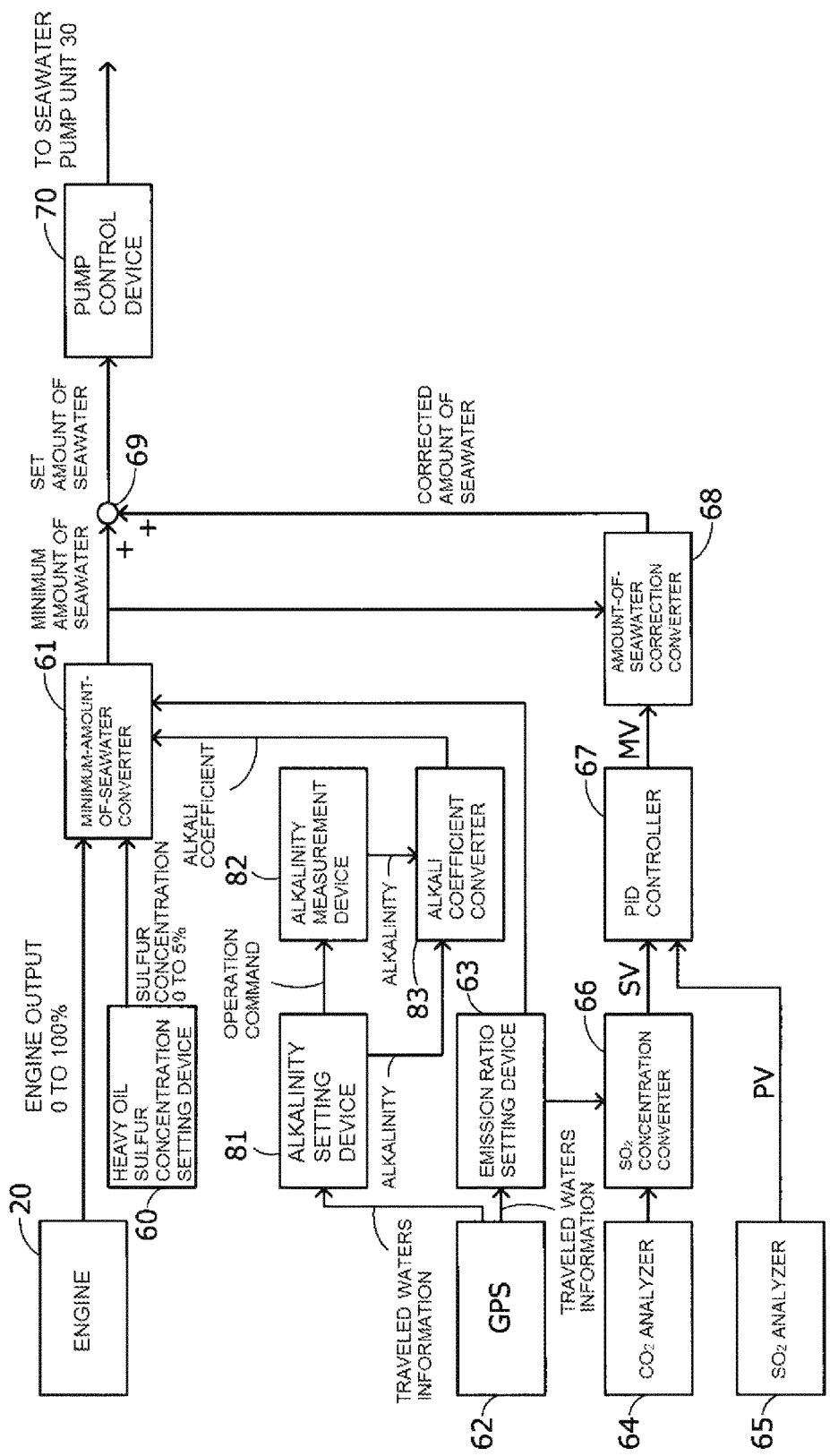
FIG. 5 is a block diagram showing the configuration of an amount-of-seawater control system in the exhaust gas processing system according to a first embodiment.

Next, the control of the amount of seawater supplied to the spray apparatus 12 of the scrubber 10 will be described. FIG. 5 is a block diagram showing the configuration of an amount-of-seawater control system in the exhaust gas processing system according to the present embodiment.

As shown in FIG. 5, the amount-of-seawater control system is provided with a heavy oil sulfur concentration setting device 60, an minimum-amount-of-seawater converter 61, a global positioning system (GPS) receiver 62, an emission ratio setting device 63, a $CO_2$ analyzer 64, an $SO_2$ analyzer 65, an $SO_2$ concentration converter 66, a PID controller 67, an amount-of-seawater correction converter 68, a summing element 69, and a pump control device 70. Moreover, the amount-of-seawater control system is also provided with an alkalinity setting device 81, an alkalinity measurement device 82 and an alkali coefficient converter 83.

The composition and operation of the amount-of-seawater control system of this kind is described here.

The amount-of-seawater control system includes a minimum-amount-of-seawater converter 61 which calculates a minimum amount of seawater, an amount-of-seawater correction converter 68 which calculates a corrected amount of seawater, and a pump control device 70 which controls the seawater pump unit 30 (see FIG. 1) so as to supply a set amount of seawater obtained by adding together these amounts, to the scrubber 10.

The output value of the engine 20 and the set value of the heavy oil sulfur concentration setting device 60 is input to the minimum-amount-of-seawater converter 61. The output value of the engine 20 is the output of the ship engine (from 0% to 100%). The set value of the heavy oil sulfur concentration setting device 60 is the sulfur concentration (0% to 5%) of the fuel oil (heavy oil) used by ships.

Correlation data between the output of the engine 20 employed and the heavy oil consumption is previously input to the minimum-amount-of-seawater converter 61, and when the output value of the engine 20 is input, this is converted to a heavy oil consumption amount. The minimum-amount-of-seawater converter 61 then calculates the minimum amount of seawater from the heavy oil consumption amount, and the sulfur concentration of the heavy oil, which is the set value of the heavy oil sulfur concentration setting device 60. Furthermore, the minimum amount of seawater is adjusted by multiplying by the alkali coefficient described below. Moreover, the minimum amount of seawater is converted to an emission ratio of sulfur dioxide in the waters being traveled. The minimum amount of seawater indicates the minimum amount of seawater required in the absorption reaction of the sulfur dioxide ($SO_2$) by the seawater, which is indicated in Formulas (1) to (3) above. A concrete example of the method for converting and adjusting the minimum amount of seawater is described below.

The GPS 62 measures the current location of the ship and outputs information about the waters being traveled based on this position, to the emission ratio setting device 63 and the alkalinity setting device 81.

Figure 6:
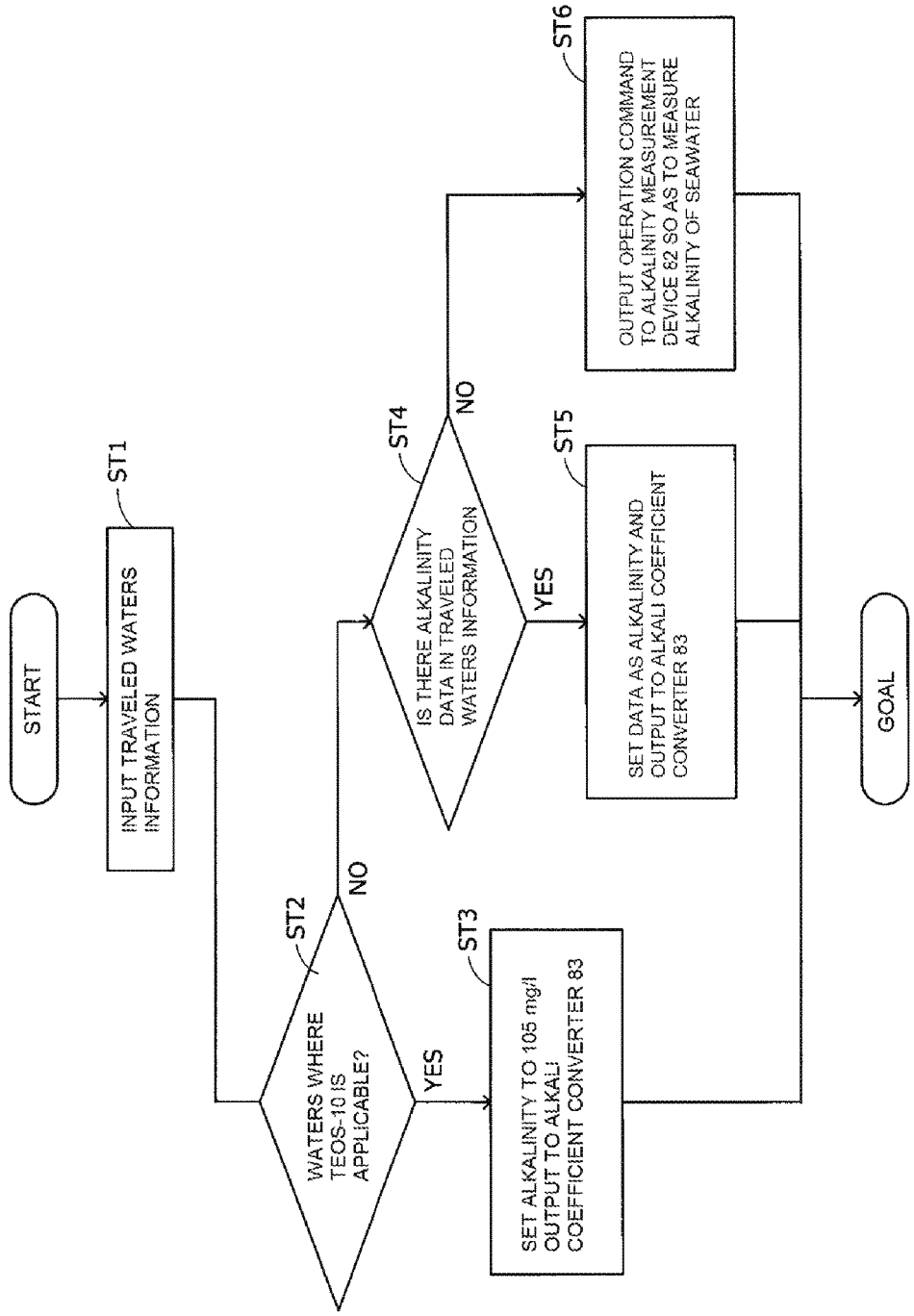
FIG. 6 is a flowchart showing the flow of processing in the alkalinity setting device.

The alkalinity setting device 81 stores the alkalinity relating to a plurality of traveled waters areas, and sets the alkalinity of the seawater at the current location of the ship, on the basis of traveled waters information output as a signal from the GPS 62. In the present specification, the term "traveled waters" refers to waters through which a vehicle including the GPS 62 or the minimum-amount-of-seawater converter 61 travels, and may also be referred to as location information, or a location of ambient seawater, referring to seawater through which the vehicle including the GPS 62 or the minimum-amount-of-seawater converter 61 travels. Here, the method for setting the alkalinity of the seawater by the alkalinity setting device 81 is described with reference to FIG. 6. FIG. 6 is a flowchart showing the flow of processing in the alkalinity setting device. The flow of processing in FIG. 6 is merely one example and may be changed, as appropriate.

As shown in FIG. 6, firstly, the alkalinity setting device receives input of traveled waters information output from the GPS 62 (step ST1). Next, it is determined whether or not the input traveled waters information relates to waters where the abovementioned standard composition of seawater (TEOS-10) can be applied (step ST2). In this determination, when the traveled waters are waters where TEOS-10 can be applied (step ST2: YES), then the alkalinity 105 mg/l calculated by reference to TEOS-10 as described above is set to 105 mg/l, and is output to the alkali coefficient converter 83 (step ST3).

On the other hand, if the traveled waters are not waters to which the TEOS-10 can be applied (step ST2: NO), then it is determined whether or not data about the alkalinity (seawater composition) is stored in the input traveled waters information (step ST4). In this determination, if data about the alkalinity of the traveled waters is stored (step ST4: YES), then this data is stored as the alkalinity (for example, 52.5 mg/l in brackish waters, etc.) and is output to the alkali coefficient converter 83 (step ST5). In step ST4, it is possible to use data that has already been measured in the waters being traveled, as the stored data.

If data about the alkalinity of the traveled waters is not stored (step ST4: NO), then an operating command to measure the alkalinity of the seawater is output to the alkalinity measurement device 82 (step ST6). As described above, in the alkalinity setting device, it is possible to set the alkalinity of the seawater selectively in accordance with the traveled waters, and in waters for which no alkalinity data is stored, it is possible to output a command for measuring the alkalinity of the seawater. While an embodiment is described above using a GPS 62, embodiments of the invention encompass any global navigation satellite system, such as GPS, Galileo, Compass, or any other global navigation satellite system, and any other type of electronic location determining system or navigation system.

Returning to FIG. 5, the alkalinity measurement device 82 starts measurement of the alkalinity of the seawater, in response to an operating command output from the alkalinity setting device 81. The seawater measured in this way is clean water before cleaning of the exhaust gas in the scrubber 10 (see FIG. 1).

There are no particular restrictions on the measurement method used in the alkalinity measurement device 82, but in the present embodiment, a method based on JIS K0102 Factory wastewater test method 15-1 Oxygen consumption (pH 4.8) is used.

The instruments and the chemicals used in the alkalinity measurement device 82 employ a magnetic stirrer, an agitator, a 100 ml tall beaker, a pH meter, an approx. 2 ml burette or 1 ml measuring pipette, a 50 ml whole pipette, 50 ml of 0.1 mol/l HCl (manufactured by Wako Pure Chemical Industries, Ltd.).

In the measurement preparations, the pH meter is calibrated previously to a pH standard liquid (pH 7 and pH 4). The frequency of calibration is set either before the start of measurement, or once a week when performing continuous measurement. The measurement procedure involves, firstly, introducing a sample of seawater into the 100 ml tall beaker with the 50 ml whole pipette. Next, the agitator on the stirrer is turned, and the pH meter which has been cleaned with pure water is immersed in the seawater sample (in this case, take care that the agitator does not touch the electrodes of the pH meter). Subsequently, the initial pH value of the seawater sample is recorded, and HCl is gradually added dripwise, via the burette (or measuring pipette). While observing the pH meter, HCl is added dripwise until reaching a pH of 4.80±0.02, and the pH value in this case, and the dropped amount of HCl is recorded. Thereupon, the pH meter is removed and cleaned with pure water, and the beaker and agitator are both washed under a flow of water.

The alkalinity is calculated by introducing the results obtained by measurement into the following equation.

$$B = a \times f \times (1000/V) \times 5.004$$

B: alkalinity (pH 4.8) (mg/l ($CaCO_3$ equivalent))
a: dropped amount of HCl (ml)
f: density of dropped HCl (0.1 mol/l)
V: sampled amount of seawater (50 ml)
5.004: coefficient The alkali coefficient converter 83 calculates the alkali coefficient on the basis of the output value (alkalinity) from the alkalinity setting device 81 and the measurement value (alkalinity) output from the alkalinity measurement device 82. The alkali coefficient converter 83 outputs the calculated alkali coefficient to the minimum-amount-of-seawater converter 61. The alkali coefficient can be calculated by the formula indicated below, when the alkalinity is taken to be B (mg/l), for instance. Alkali coefficient=105/B As described above, in the case of seawater in which the standard composition of seawater (TEOS-10) can be applied for the traveled waters information, the alkalinity input from the alkalinity setting device 81 to the alkali coefficient converter 83 is set to 105 mg/l. Therefore, the calculated alkali coefficient=105/105=1.

In brackish waters where the alkalinity is low and TEOS-10 cannot be applied, the alkalinity is lower than the standard composition of seawater (lower than 105 mg/l), and the alkali coefficient is greater than 1 and equal to or lower than 1000. The reason why the alkalinity is equal to or lower than 1000 is because, when the alkali coefficient is 1000, then the alkalinity is approximately 0.1% that of standard seawater, which corresponds to fresh water, such as lake water or river water, that has virtually no alkalinity.

If the waters are waters where TEOS-10 cannot be applied and the alkalinity is higher than the standard composition of seawater (greater than 105 mg/l), then the alkali coefficient is equal to or greater than 0.05 and less than 1.0. Waters of high alkalinity are, for instance, the Dead Sea, and the salt concentration in the Dead Sea is approximately 30%, which is around ten times that of standard seawater (approximately 3%). Taking this into account, then assuming a maximum alkalinity 20 times that of standard seawater, the alkali coefficient is set to 0.05 or more in response to this. Since the amount of seawater used can be reduced in waters of high alkalinity, then an advantage is obtained in that the pump power can be reduced.

The emission ratio setting device 63 outputs the emission ratio of sulfur dioxide ($SO_2$) in the waters, to the $SO_2$ concentration converter 66, on the basis of the traveled waters information which is input manually or by a signal from a GPS 62.

Here, the emission ratio is a numerical value determined by the sulfur concentration in the fuel. Furthermore, the sulfur concentration in the fuel is confirmed by measuring the emission ratio of carbon dioxide ($CO_2$) and sulfur dioxide ($SO_2$) in the exhaust gas.

Moreover, the emission ratio setting device 63 outputs a command to the minimum-amount-of-seawater converter 61 on the basis of a signal from the GPS 62 or a manually input traveled waters information. For example, if the traveled waters information from the GPS 62 indicates an "Emission Control Area (ECA)", then a command is output to calculate in accordance with the limit of "sulfur concentration in fuel 0.1% or lower" (called "0.1% limit" below). Furthermore, "outside ECA" means that a command is output to calculate in accordance with a limit of "sulfur concentration in fuel 0.5% or lower" (called "0.5% limit" below), this limit being scheduled to come into effect around 2025. Although it depends on the sulfur concentration of the fuel used, if the standard sulfur concentration is taken to be 2.7%, then with the 0.1% limit, it is necessary to remove 2.6%, and with the 0.5% limit, it is necessary to remove 2.2%.

Here, a method for calculating the minimum amount of seawater in the minimum-amount-of-seawater converter 61 is described with reference to specific examples.

It is supposed that the following data has been input previously into the minimum-amount-of-seawater converter 61.
  Rated output of engine 20 (see FIG. 1): 10 MW
  Fuel consumption to output of engine 20: 0.2 kg/kWh
  Molecular weight of sulfur: 32.07 g/mol
  Molecular weight of calcium carbonate ($CaCO_3$): 100.09 g/mol
  Alkalinity of seawater: 105 mg/l (see standard composition indicated above TEOS-10)
Furthermore, the fuel sulfur concentration of 3 wt % is input previously to the heavy oil sulfur concentration setting device 60.

When 50% is input to the minimum-amount-of-seawater converter 61, as the output value of the engine 20, then the fuel consumption (heavy oil consumption) is calculated as indicated below.

Fuel consumption=0.5×10,000 kW×0.2 kg/kWh=1,000 kg/h

From the calculation results for the fuel consumption, and the sulfur concentration (3 wt %) in the fuel, the mass flow rate of sulfur is calculated to be 30 kg/h.

On the other hand, since the calcium carbonate is an alkali which absorbs sulfur, and the alkalinity consumed by absorption and oxidation to sulfuric acid, per gram of sulfur, is calculated as indicated below.

100.09/32.07=3.12 g

Furthermore, the alkalinity consumed by absorption and oxidation to sulfurous acid, per gram of sulfur, is calculated as indicated below.

3.12/2=1.56 g

Consequently, in order to absorb the mass flow rate of sulfur (30 kg/h) indicated above, as sulfurous acid, alkali of 30×1.56=46.8 kg/h ($CaCO_3$ equivalent) is required. When the residual alkalinity of the waste seawater after the absorption reaction is taken to be 5 mg/l, then the alkali supplied from the seawater is calculated as 105−5=100 mg/l=0.1 kg/m$^3$. The minimum amount of seawater is calculated as indicated below from these calculation results.

Minimum amount of seawater=46.8/0.1=468 m$^3$/h

The method used to calculate the minimum amount of seawater is for a case where all of the sulfur in the fuel needs to be removed. Therefore, when a command is output from the emission ratio setting device 63 to convert to a value corresponding to the 0.5% limit, it is necessary to remove 2.5 wt % of the 3.0 wt % sulfur concentration in the fuel, and therefore the mass flow rate of sulfur that needs to be removed is 25 kg/h. Therefore, the mass flow rate of sulfur, 30 kg/h, in the calculation above is substituted with 25 kg/h, and the minimum amount of seawater is calculated as 390 m$^3$/h. Consequently, the mass flow rate of sulfur is changed in accordance with the sulfur concentration limit for the traveled waters, and the minimum amount of seawater corresponding to this is calculated.

Moreover, the method for calculating the minimum amount of seawater uses a method for a case where the alkali coefficient output from the alkali coefficient converter 83 is 1 (in the case of standard seawater where TEOS-10 can be applied to the waters being traveled). In cases where the alkali coefficient is not equal to 1, then the alkali coefficient is multiplied by the minimum amount of seawater calculated as described above. In brackish waters where the alkalinity is lower than standard waters, the alkali coefficient is greater than 1, and therefore the minimum amount of seawater is adjusted and increased by multiplication by the alkali coefficient. On the other hand, in waters where the alkalinity is higher than standard waters, the alkali coefficient is lower than 1, and therefore the minimum amount of seawater is adjusted and decreased by multiplication by the alkali coefficient. In this way, the minimum amount of seawater is adjusted on the basis of the alkalinity corresponding to the waters being traveled.

The $CO_2$ analyzer 64 measures the concentration of the $CO_2$ contained in the processed exhaust gas discharged into the atmosphere from the scrubber 10 (the outlet $CO_2$ concentration). The output value of the $CO_2$ analyzer 64 is input to the $SO_2$ concentration converter 66. The $SO_2$ concentration converter 66 calculates the $SO_2$ concentration (ppm) to be cleaned by multiplying the emission ratio by the outlet $CO_2$ concentration (%), and calculates the set value (SV) of the outlet $SO_2$ concentration by further multiplying by a safety ratio of 0.8. This set value (SV) of the outlet $SO_2$ concentration is output to the PID controller 67 from the $SO_2$ concentration converter 66.

For example, in waters with a 0.1% limit, the designated emission ratio is 4.3. When the outlet $CO_2$ concentration measured by the $CO_2$ analyzer 64 is 5%, then the $SO_2$ concentration should be cleaned to no more than 21.5 ppm (=4.3×5), and by multiplying this value by a safety ratio of 0.8, an outlet $SO_2$ concentration set value of 17.2 ppm is obtained.

The $SO_2$ analyzer 65 measures the concentration of $SO_2$ contained in the processed exhaust gas discharged into the atmosphere from the scrubber 10 (the outlet $SO_2$ concentration). This set value (PV) of the outlet $SO_2$ concentration is output to the PID controller 67 from the $SO_2$ analyzer 65.

The PID controller 67 calculates an operation amount (MV) by carrying out a PID control calculation on the basis of the deviation of the outlet $SO_2$ concentration set value which is input as an SV value and the outlet $SO_2$ concentration set value which is input as a PV value, and the MV is output to the amount-of-seawater correction converter 68. The PID controller 67 has a function for responding by switching between automatic and manual, in respect of the input or output of the SV value, the PV value or the MV value. Consequently, when an input is not obtained from the $SO_2$ analyzer 65, for example, due to a fault or maintenance, or the like, then it is possible to respond by switching from automatic input to manual input.

The amount-of-seawater correction converter 68 sets the operation amount (MV) which is the output of the PID controller 67, to an amount-of-seawater correction value proportionate to the minimum amount of seawater, and calculates a corrected amount of seawater. For example, if the minimum amount of seawater calculated by the minimum-amount-of-seawater converter 61 is 100 t/h, the MV value is 100% and the proportional constant is 0.5, then the amount-of-seawater correction converter 68 calculates a corrected amount of seawater of 50 t/h. The proportional constant may be given as a variable value in relation to the minimum amount of seawater, rather than a fixed value. Furthermore, in the amount-of-seawater correction converter 68, a corrected amount of seawater is calculated by applying the multiplication described above to the minimum amount of seawater, and therefore the corrected amount of seawater is also adjusted on the basis of the alkalinity.

In the summing element 69, the set amount of seawater is calculated by summing the minimum amount of seawater calculated by the minimum-amount-of-seawater converter 61, and the corrected amount of seawater calculated by the amount-of-seawater correction converter 68. The set amount of seawater calculated by the summing element 69 is input to the pump control device 70. The pump control device 70 controls the seawater pump unit 30 and supplies seawater of this set amount of seawater to the scrubber 10. The set amount of seawater supplied to the scrubber 10 is calculated by summing the minimum amount of seawater and the corrected amount of seawater which are adjusted respectively on the basis of the alkalinity, and therefore the set amount of seawater supplied to the scrubber 10 is also adjusted on the basis of the alkalinity.

The actual amount of seawater supplied from the seawater pump unit 30 to the scrubber 10 can be measured by installing a flow meter in the seawater pump unit 30. In this case, feedback control may be carried out, by comparing the actual amount of seawater measured by the pump control device 70 with the set amount of seawater. However, even if the outlet $SO_2$ concentration in the scrubber 10 has risen due to an insufficiency in the actual amount of seawater supplied to the scrubber 10 from the seawater pump unit 30, the corrected amount of seawater is guided in an increasing direction by the PID controller 67 in the amount-of-seawater control system.

The pump for supplying seawater to the scrubber 10 may be a single pump or a plurality of pumps. If a plurality of pumps is provided, the plurality of pumps may be controlled by the pump control device 70 in such a manner that the number of operating pumps is raised in accordance with increase in the set amount of seawater, and the number of operating pumps is reduced in accordance with decrease in the set amount of seawater.

Figure 7:
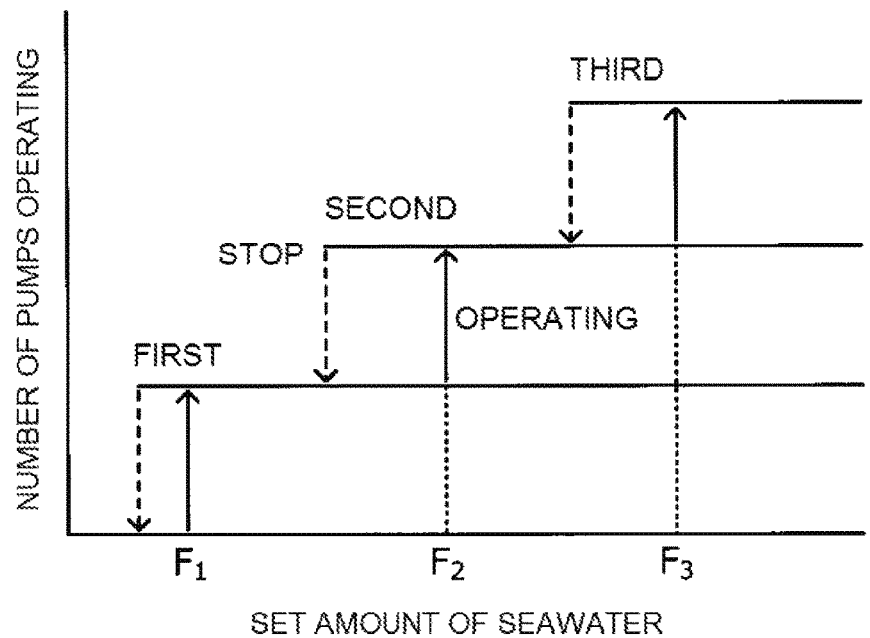
FIG. 7 is a diagram showing a relationship between the number of pumps operating and the set amount of seawater, when a plurality of pumps is provided.

FIG. 7 is a diagram showing a relationship between the number of pumps operating and the set amount of seawater, when a plurality of pumps is provided. In FIG. 7, three pumps for supplying seawater to the scrubber 10 are provided, and the solid line indicates an operating state of the pump and a dotted line indicates a stopped state of the pump. As shown in FIG. 7, when the set amount of seawater is between ($F_1$) and ($F_2$), only one pump operates, and when the set amount of seawater exceeds ($F_2$), a second pump also starts to operate. Moreover, when the set amount of seawater exceeds ($F_3$), then a third pump also starts to operate. Furthermore, when the set amount of seawater decreases below ($F_3$), the third pump stops operation, and when the set amount of seawater decreases below ($F_2$), the second pump stops operation.

When a plurality of pumps are controlled as shown in FIG. 7, in order to avoid frequent repetition of an operating state and a stopped state of the pumps, it is necessary for the PID controller 67 in the amount-of-seawater control system to be limited to proportionate control, in such a manner that integrated control is not carried out.

Figure 8:
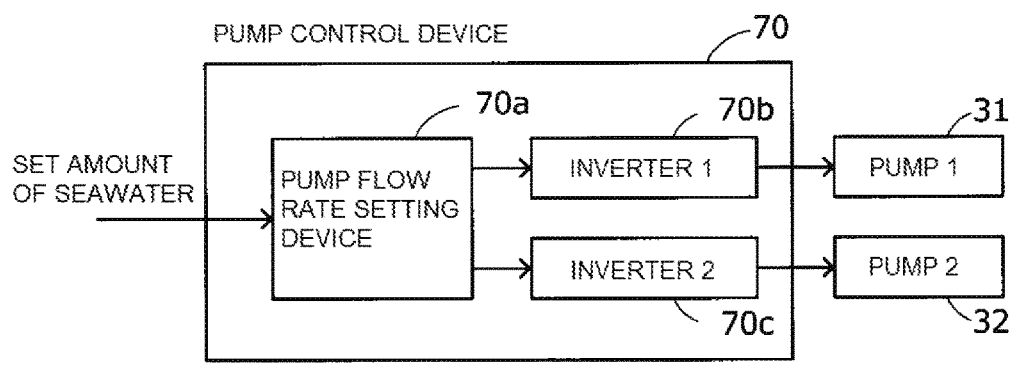
FIG. 8 is a block diagram showing a configuration in a case where a pump control device according to the first embodiment is provided with an inverter.
Figure 9:
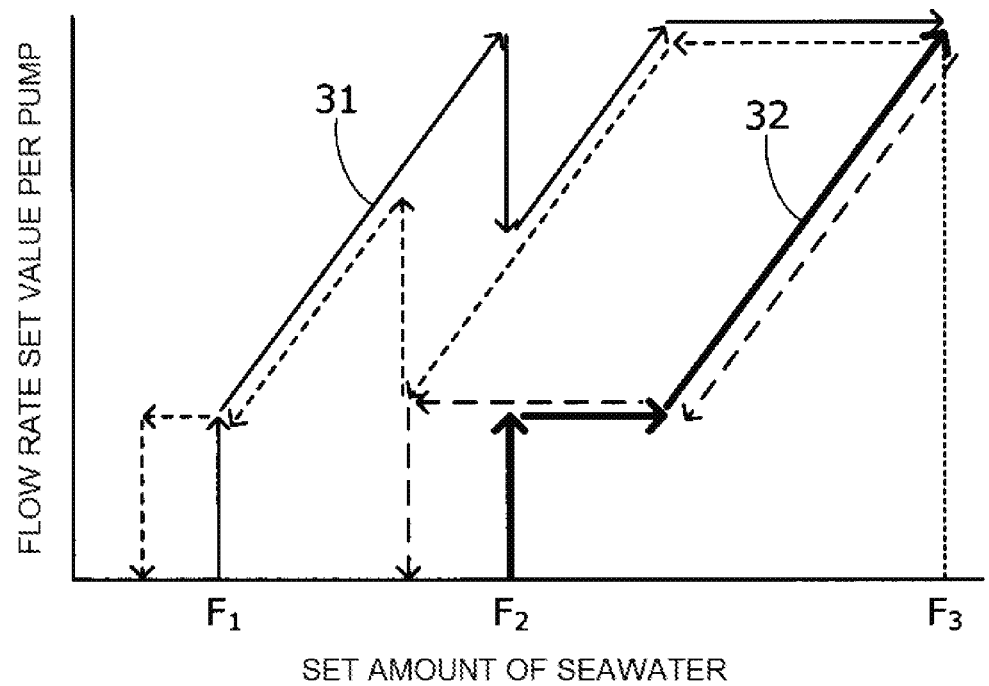
FIG. 9 is a diagram showing a relationship between a flow rate set value per pump, and a set seawater amount, in a case where a plurality of pumps according to the first embodiment are provided.

Furthermore, as shown in FIG. 8 and FIG. 9, it is also possible to adopt a configuration in which a plurality of pumps are controlled by an inverter in the pump control device 70. In this case, it is possible to apply precise pump control, compared to a case where control by an inverter is not implemented.

FIG. 8 is a block diagram showing a configuration of a case where the pump control device 70 is provided with an inverter. For example, when two pumps for supplying seawater to the scrubber 10 are provided, as shown in FIG. 8, the pump control device 70 is provided with a pump flow rate setting device 70a, a first inverter 70b and a second inverter 70c. The pump flow rate setting device 70a sets a flow rate per pump. The first inverter 70b controls a first pump 31, and the second inverter 70c controls a second pump 32.

FIG. 9 is a diagram showing a relationship between the flow rate set value per pump and the set amount of seawater, according to the configuration shown in FIG. 8. In FIG. 9, a solid line indicates an operating state of a pump, and a broken line indicates a stopped state of a pump.

As shown in FIG. 9, when the set amount of seawater is between ($F_1$) and ($F_2$), only the first pump 31 operates, and the flow rate set value of the first pump 31 gradually increases as the set amount of seawater increases from ($F_1$) to ($F_2$). When the set amount of seawater exceeds ($F_2$), then the second pump 32 also starts to operate. In this case, the flow rate set value of the first pump 31 decreases with the operation of the second pump 32. As the set amount of seawater increases from ($F_2$) to ($F_3$), the flow rate set values in the first pump 31 and the second pump 32 progressively increase.

Furthermore, as the set amount of seawater decreases from ($F_3$), the flow rate set values in the first pump 31 and the second pump 32 progressively decrease. When the set amount of seawater decreases below ($F_2$), then a second pump 32 stops operating. In this case, the flow rate set value of the first pump 31 increases with the stopping of operation of the second pump 32.

The control of the plurality of pumps by an inverter, which is illustrated in FIG. 8 and FIG. 9, is effective in cases where the possible values of the set amount of seawater are set to a broad range, in other words, cases where the range of the engine load variation and the range of sulfur content of the fuel oil are set to broad ranges, or the like.

The setting devices, converter and PID controller 67 illustrated in FIG. 5 may be configured by a combination of individual apparatuses or may be configured by a programmable logic controller (PLC).

According to the amount-of-seawater control system of this kind, the alkali content required to absorb the sulfur oxides (in particular, sulfur dioxide ($SO_2$)) contained in the consumed heavy oil is calculated as a minimum amount of seawater, from the engine output and the sulfur content in the heavy oil used, and moreover, a corrected amount of seawater is calculated in such a manner that the sulfur oxide concentration contained in the processed exhaust gas which is discharged into the atmosphere from the scrubber 10 does not exceed the emission limit value, and a set amount of seawater obtained by summing together these two amounts is supplied to the scrubber 10. By this configuration, it is possible to achieve stable operation by supplying an appropriate amount of seawater to the scrubber 10 in such a manner that the sulfur oxide concentration in the exhaust gas after processing does not exceed the limit value, without the amount of seawater supplied to the scrubber 10 being excessive or insufficient.

Furthermore, in the amount-of-seawater control system according to the present embodiment, it is possible to set the alkalinity of the seawater by the alkalinity setting device 81, in accordance with the traveled waters information from the GPS 62, and the set amount of seawater supplied to the scrubber 10 can be adjusted and increased or decreased on the basis of this alkalinity. Consequently, it is possible to make the set amount of seawater supplied to the scrubber 10 more appropriate, and the motive power of the seawater pump unit 30 can be reduced.

Furthermore, in FIG. 6, when the option for implementing step ST3 or ST5 is selected, the data that is already stored can be set as the alkalinity, and therefore measurement by the alkalinity measurement device 82 can be omitted. In other words, since measurement by the alkalinity measurement device 82 is carried out only when the option for implementing step ST6 is selected, then it is possible to reduce the alkalinity measurement frequency and the use frequency of the pH meter, and the maintenance frequency of the pH meter, and the like, can be reduced.

Furthermore, in the alkalinity measurement device 82, the seawater is measured before cleaning the exhaust gas by the scrubber 10, and therefore it is possible to suppress the inclusion of smoke, and the like, into the seawater being measured, compared to when measuring the liquid bottoms after cleaning the exhaust gas. Consequently, it is possible to lower the burden of maintenance, such as cleaning of the pH meter, etc.

Furthermore, since there are a plurality of traveled water regions for which the alkalinity is stored in the alkalinity setting device 81, then by increasing the number of these water regions, it is possible to extend the scope of the waters in which measurement by the alkalinity measurement device 82 can be omitted, and hence the frequency of use of the pH meter can be reduced further. Moreover, by increasing the number of traveled water regions for which the alkalinity is stored, while reducing the size of each traveled water region, it is possible to raise the accuracy of the alkalinity and to further optimize the amount of sweater that is calculated.

Moreover, in waters where the standard composition of seawater (TEOS-10) can be applied, it can be presumed that the alkalinity of the seawater is a uniform value, and hence the alkali coefficient is also taken to be uniform and the processing burden for calculating the amount of seawater can be reduced. In this case, it is possible to calculate the minimum amount of seawater from the engine output and the sulfur content of the fuel oil alone.

Below, a second embodiment of the present invention is described in detail with reference to the accompanying drawings. In the second embodiment, constituent elements which are common with the first embodiment are labelled with the same reference numerals and illustration and description thereof is omitted.

Figure 10:
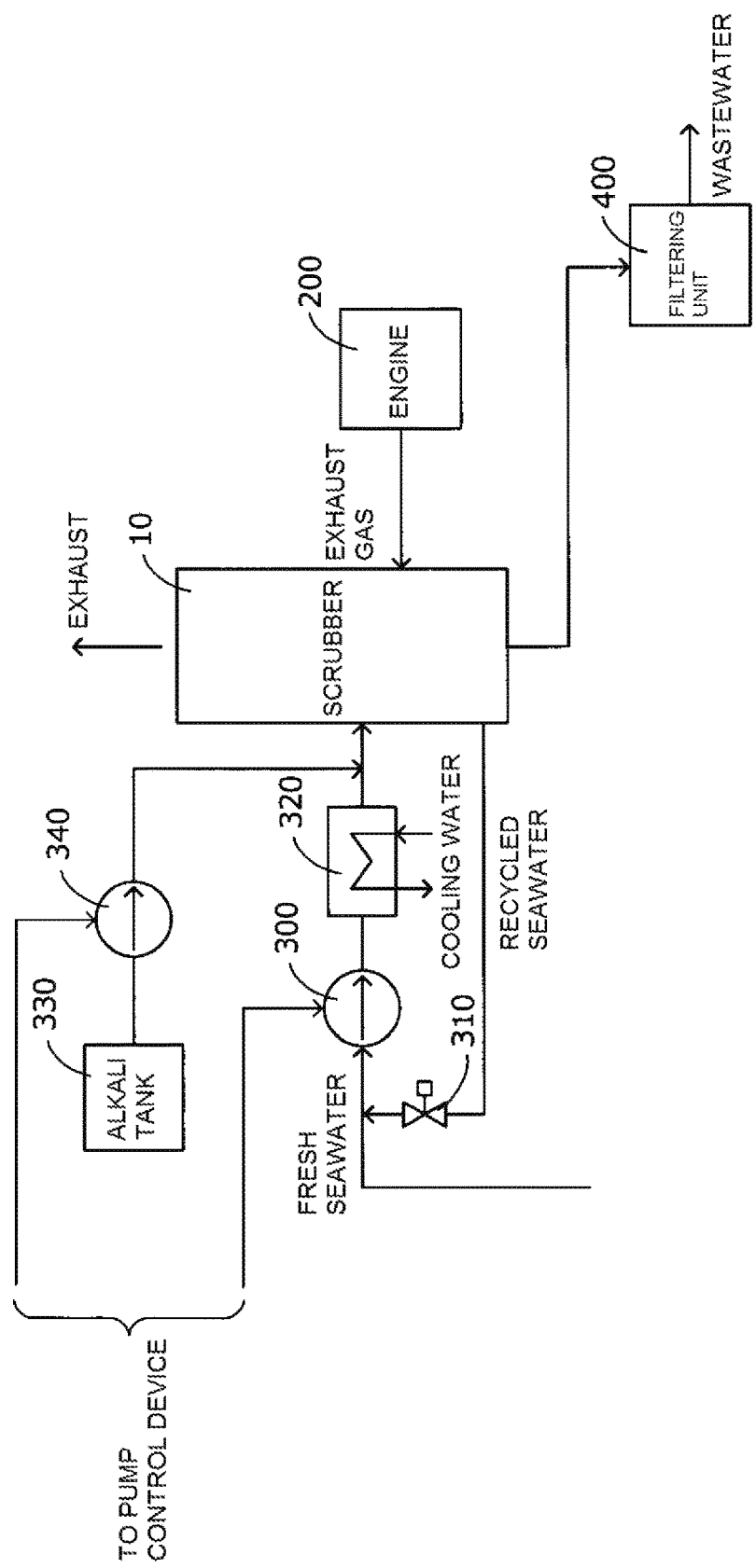
FIG. 10 is an illustrative diagram showing an exhaust gas processing system centered on a scrubber according to a second embodiment.

FIG. 10 is a schematic drawing showing an exhaust gas processing system centered on a scrubber according to a second embodiment. As shown in FIG. 10, the exhaust gas processing system is principally composed by a scrubber 10 which receives a supply of exhaust gas from the engine 200, a seawater pump 300 which supplies seawater to the scrubber 10, and a filtering unit 400 for filtering the wastewater discharged from the scrubber 10. The scrubber 10 is configured to be able to supply recycled seawater obtained by recycling seawater which has been used for cleaning, and fresh seawater which has not been used for cleaning.

The exhaust gas emitted from the engine 200 is introduced into the scrubber 10. This exhaust gas contains 50 to 1500 ppm of sulfur dioxide ($SO_2$). As this exhaust gas rises up inside the scrubber 10, seawater that has been introduced into the scrubber 10 via the seawater pump 300 is sprayed, and a gas-liquid contact is created.

A reaction proceeds as indicated in Formulas (1) to (3) in the first embodiment, and the exhaust gas from which sulfur dioxide ($SO_2$) has been removed is discharged into the atmosphere from the top of the scrubber 10.

The seawater sprayed inside the scrubber 10 drops down under gravity along the inner circumferential surface of the scrubber 10, and collects in a collecting section below the scrubber 10. The collected seawater is discharged from the scrubber 10, and is then discharged into the sea after passing through the filtering unit 400.

Depending on the waters being traveled by the ship, it may not be possible to discharge the seawater collected from the scrubber 10, into the sea, due to restrictions. In this case, the seawater collected in the collecting section of the scrubber 10 or in a separately provided tank is supplied back to the seawater pump 300 via a recycling amount control valve 310, and is thereby used for exhaust gas processing in the scrubber 10.

The recycling amount control valve 310 is composed in such a manner that only fresh seawater is supplied to the seawater pump 300, when the valve is fully closed, and only recycled seawater is supplied to the seawater pump 300, when the valve is fully open. The degree of opening of the recycling amount control valve 310 is set so as to correspond to the amount of wastewater permitted in the waters where the ship is traveling. The amount of wastewater may be calculated from a previously obtained valve degree of opening and seawater pump capacity, or may be measured by providing a flow meter at the fresh seawater inlet.

The exhaust gas from the engine 200 has a high temperature of 200° C. to 400° C., and therefore the temperature of the recycled seawater is raised by absorbed heat from the exhaust gas. Therefore, recycled seawater which is supplied to the seawater pump 300 from the scrubber 10 via the recycling amount control valve 310 is cooled by cooling water in a heat exchanger 320, and is then supplied again to the scrubber 10.

Furthermore, the alkali component in the recycled seawater is consumed by absorption of sulfur dioxide ($SO_2$) in the scrubber 10. If the alkali component of the seawater is insufficient, then the reaction for absorbing the sulfur dioxide ($SO_2$) in the exhaust gas by the seawater is inhibited, and there is a risk that the sulfur dioxide ($SO_2$) concentration contained in the processed exhaust gas discharged into the atmosphere from the scrubber 10 may exceed the emission limit value.

Therefore, an alkali agent is injected from an alkali tank 330, via an alkali pump 340, into the recycled seawater which is supplied to the seawater pump 300 from the scrubber 10 via the recycling amount control valve 310, before the seawater is supplied again to the scrubber 10. Details of the control of the amount of alkali in this case are described below. A caustic soda (NaOH) solution may be used as the alkali agent.

The configuration of the scrubber 10 is the same as the scrubber 10 according to the first embodiment, apart from the fact that the spray apparatus 12 shown in FIG. 3 is connected to the seawater pump 300 and the gas supply apparatus 13 is connected to the engine 200, and therefore illustration and description thereof is omitted here.

As shown in FIG. 4, the further the amount of seawater supplied to the scrubber 10 is raised and the greater the amount of seawater sprayed by the spray apparatus 12, the greater the increase in the rate of removal of the sulfur dioxide ($SO_2$). This is because in addition to the increase in the contact surface area between the exhaust gas and the seawater due to increase in the surface area of the droplets when the amount of sprayed seawater is increased, the total amount of the alkali component contained in the seawater also increases.

Due to the relationship between the amount of seawater and the rate of removal of sulfur dioxide ($SO_2$) shown in FIG. 4, when the exhaust gas which is discharged into the atmosphere from the opening section 11$c$ of the scrubber main body 11 contains a high concentration of sulfur dioxide ($SO_2$) (high outlet $SO_2$ concentration), then it is possible to reduce the outlet $SO_2$ concentration by increasing the amount of seawater sprayed by the spray apparatus 12.

Figure 11:
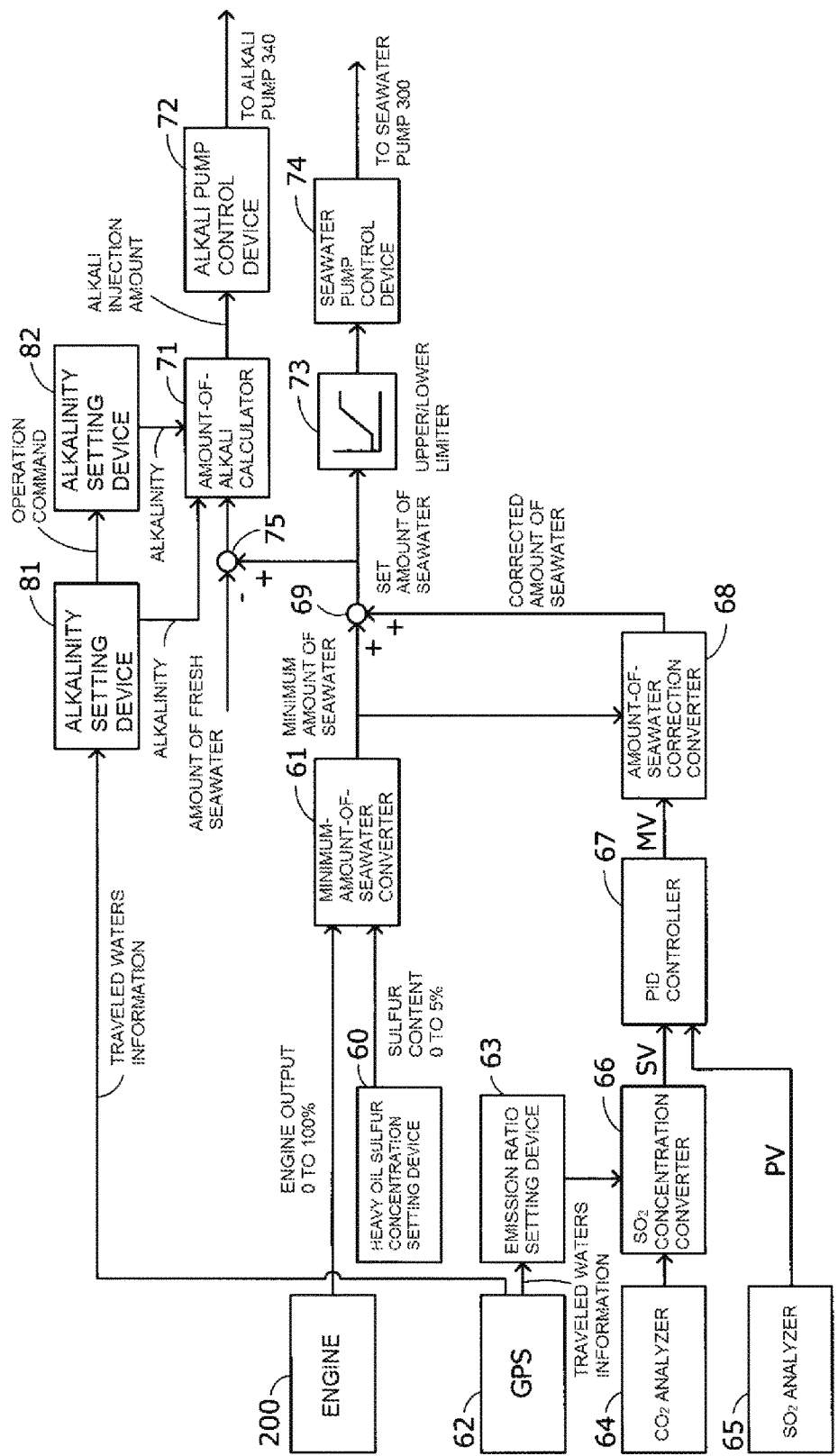
FIG. 11 is a block diagram showing the configuration of an amount-of-alkali control system in the exhaust gas processing system according to the second embodiment.

There follows a description of the amount-of-alkali control in a case where an alkali agent is injected into the recycled seawater which is supplied to the spray apparatus 12 of the scrubber 10. FIG. 11 is a block diagram showing the configuration of an amount-of-alkali control system in the exhaust gas processing system according to the present embodiment.

As shown in FIG. 11, this amount-of-alkali control system is provided with a heavy oil sulfur concentration setting device 60, a minimum-amount-of-seawater converter 61, a GPS 62, an emission ratio setting device 63, a $CO_2$ analyzer 64, an $SO_2$ analyzer 65, an $SO_2$ concentration converter 66, a PID controller 67, a seawater correction converter 68, a summing element 69, an alkalinity setting device 81, and an alkalinity measurement device 82, similarly to the first embodiment, and in addition to this, is also provided with a summing and subtracting element 75, an amount-of-alkali calculator 71, an alkali pump control device 72, an upper/lower limiter 73, and a seawater pump control device 74.

The composition and operation of the amount-of-seawater control system of this kind is described here. Compositional elements and operations which are the same as or similar to those of the first embodiment are not described here or are only described briefly.

The alkali control system is composed by a minimum-amount-of-seawater converter 61 which calculates a minimum amount of seawater, an amount-of-seawater correction converter 68 which calculates a corrected amount of seawater, and an amount-of-alkali calculator 71 which calculates an alkali injection amount for injection into the recycled seawater on the basis of an amount of seawater corresponding to the difference between the set amount of seawater, which is the sum of the minimum amount of seawater and the corrected amount of seawater, and an amount of fresh seawater.

In the summing element 69, the set amount of seawater is calculated by summing the minimum amount of seawater calculated by the minimum-amount-of-seawater converter 61, and the corrected amount of seawater calculated by the amount-of-seawater correction converter 68. Next, the amount of seawater corresponding to the difference obtained by subtracting the amount of fresh seawater from the set amount of seawater is calculated in the summing and subtracting element 75. The amount of seawater calculated by the summing and subtracting element 75 is input to the amount-of-alkali calculator 71.

The alkalinity setting device 81 and the alkalinity measurement device 82 have a similar configuration to the first embodiment, except for the fact that the outputs thereof are sent to the amount-of-alkali calculator 71. Similarly to the alkali coefficient converter 83 according to the first embodiment, the amount-of-alkali calculator 71 converts the alkali coefficient on the basis of the output value (alkalinity) form the alkalinity setting device 81, and the measurement value (alkalinity) output from the alkalinity measurement device 82.

The amount-of-alkali calculator 71 calculates an alkali content which is contained in seawater corresponding to the amount of seawater calculated by the summing and subtracting element 75, and also calculates an alkali injection amount corresponding to this alkali content. The alkalinity of seawater is 105 (ppm) when converted to a $CaCO_3$ value, or 105 (mg/l) (see the standard composition TEOS-10 indicated above), and therefore if the amount of seawater is 100 (t/h), for example, then the alkali content contained in the seawater corresponding to this amount of seawater is calculated to be 105 ($g/m^3$)×100 ($m^3/h$)=10500 (g/h)=10.5 (kg/h). Converting this to NaOH, the value is 8.4 (kg/h), and therefore the alkali injection amount when using 25(%) caustic soda solution having a specific gravity of 1.27 is calculated to be 8.4/0.25/1.27≅26.5 (l/h).

Moreover, the method for calculating the alkali injection amount uses a method for a case where the alkali coefficient calculated by the alkali coefficient converter 83 is 1 (in the case of standard seawater where TEOS-10 can be applied to the waters being traveled). The alkali coefficient is calculated by "alkali coefficient=105/B", similarly to the first embodiment. In cases where the alkali coefficient is not equal to 1, then the alkali coefficient is multiplied by the alkali injection amount calculated as described above. In brackish waters where the alkalinity is lower than standard waters, the alkali coefficient is greater than 1, and therefore the alkali injection amount is adjusted so as to increase by multiplication by the alkali coefficient. On the other hand, in waters where the alkalinity is higher than standard waters, the alkali coefficient is lower than 1, and therefore the alkali injection amount is adjusted so as to decrease by multiplication by the alkali coefficient. In this way, the alkali injection amount is adjusted on the basis of the alkalinity corresponding to the waters being traveled.

The amount-of-alkali calculator 71 outputs the calculated alkali injection amount to the alkali pump control device 72. The alkali pump control device 72 controls the alkali pump 340 and injects alkali agent corresponding to the alkali injection amount into the recycled seawater which is supplied to the scrubber 10.

Furthermore, the set amount of seawater calculated in the summing element 69 is input to the upper/lower limiter 73. The upper/lower limiter 73 specifies upper and lower limiter values for the amount of seawater supplied to the scrubber 10 via the seawater pump 300, and if the set amount of seawater which is input exceeds the upper limiter value, then this upper limiter value is output as the amount of seawater to be supplied to the scrubber 10. Similarly, if the set amount of seawater which is input exceeds the lower limiter value, then the upper/lower limiter 73 outputs the lower limiter value as the amount of seawater to be supplied to the scrubber 10. In other words, the upper/lower limiter 73 restricts the amount of seawater supplied to the scrubber 10, to a range between the upper and lower limit values.

In the present invention, the alkali component used to absorb and remove the sulfur dioxide ($SO_2$) in the exhaust gas does not depend only on the alkali component in the seawater, but rather a separate alkali agent can be injected, and therefore the amount of seawater supplied to the scrubber 10 can be maintained at an amount which enables absorption and removal of the sulfur dioxide ($SO_2$) in the exhaust gas by contact between the exhaust gas and the seawater, rather than an amount which compensates for the alkali component. Consequently, if the set amount of seawater exceeds the amount of seawater at which the sulfur dioxide ($SO_2$) in the exhaust gas can be absorbed and removed by contact between the exhaust gas and the seawater, then the amount of seawater is set to the upper limiter value, which is set as the amount of seawater to be supplied to the scrubber 10.

It is necessary to inject an amount of alkali such that the amount of alkali supplied to the scrubber 10 matches the amount of sulfur dioxide ($SO_2$) to be processed, and if the amount of alkali is insufficient, then the sulfur dioxide ($SO_2$) concentration in the exhaust gas exceeds the limit value, which is problematic. Therefore, by setting an upper limiter value and a lower limiter value of the amount of seawater supplied to the scrubber 10, by means of the upper/lower limiter 73, an amount of alkali which is proportionate to the difference between the set amount of seawater calculated by the summing element 69, and the amount of fresh seawater, is supplied, while reducing the power of the seawater pump 300, and therefore it is possible to supply an appropriate amount of alkali to the scrubber 10 and stable operation can be achieved.

The amount of seawater set by the upper/lower limiter 73 is input to the seawater pump control device 74. The seawater pump control device 74 controls the seawater pump 300 and supplies seawater of this amount to the scrubber 10.

The actual amount of seawater supplied from the seawater pump 300 to the scrubber 10 can be measured by installing a flow meter in the seawater pump 300. In this case, feedback control may be carried out, by comparing the actual amount of seawater measured by the seawater pump control device 74 with the set amount of seawater. However, even if the outlet $SO_2$ concentration in the scrubber 10 has risen due to an insufficiency in the amount of alkali supplied to the scrubber 10 from the seawater pump 300, the corrected amount of seawater is guided in an increasing direction by the PID controller 67 in the amount-of-alkali control system, and therefore the alkali injection amount is increased.

The pump for supplying seawater to the scrubber 10 may be a single pump or a plurality of pumps. If a plurality of pumps is provided, the plurality of pumps may be controlled by the seawater pump control device 74 in such a manner that the number of operating pumps is raised in accordance with increase in the set amount of seawater, and the number of operating pumps is reduced in accordance with decrease in the set amount of seawater (see FIG. 7).

When a plurality of pumps is controlled as shown in FIG. 7, in order to avoid frequent repetition of an operating state and a stopped state of the pumps, it is necessary for the PID controller 67 in the amount-of-alkali control system to be limited to proportionate control, in such a manner that integrated control is not carried out.

Figure 12:
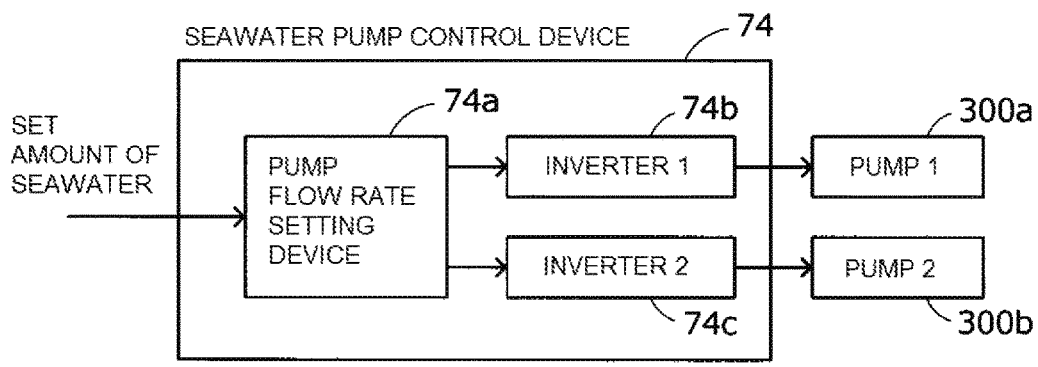
FIG. 12 is a block diagram showing a configuration in a case where a pump control device according to the second embodiment is provided with an inverter.
Figure 13:
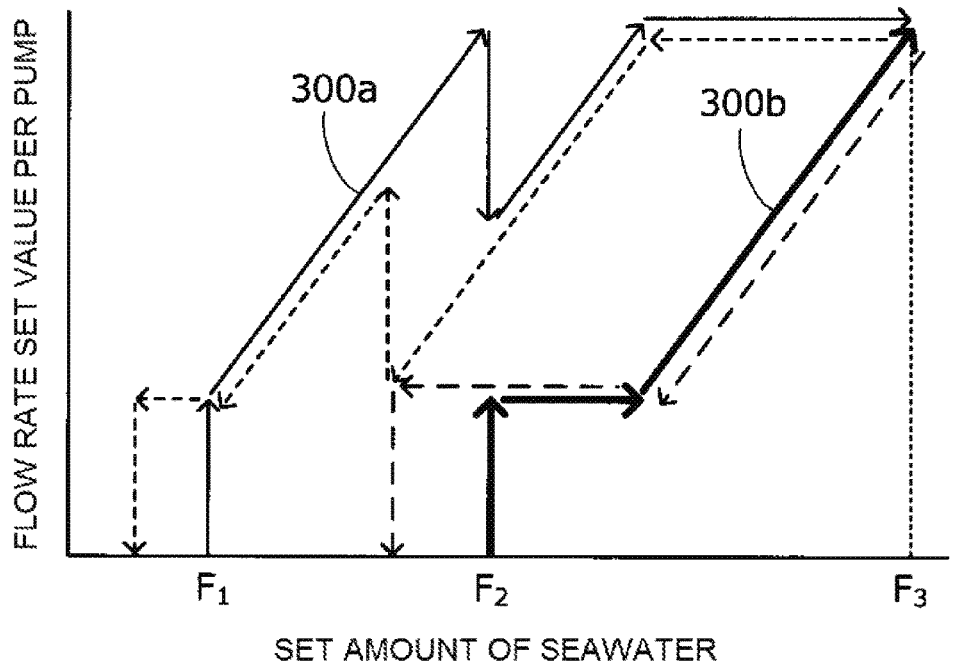
FIG. 13 is a diagram showing a relationship between a flow rate set value per pump, and a set seawater amount, in a case where a plurality of pumps according to the second embodiment are provided.

Furthermore, as shown in FIG. 12 and FIG. 13, it is also possible to adopt a configuration in which a plurality of pumps are controlled by an inverter in the seawater pump control device 74. In this case, it is possible to apply precise pump control, compared to a case where control by an inverter is not implemented.

FIG. 12 is a block diagram showing a configuration of a case where the seawater pump control device 74 is provided with an inverter. For example, when two pumps for supplying seawater to the scrubber 10 are provided, as shown in FIG. 12, the seawater pump control device 74 is provided with a pump flow rate setting device 74a, the first inverter 74b and the second inverter 74c. The pump flow rate setting device 74a sets a flow rate per pump. The first inverter 74b controls the first pump 300a, and the second inverter 74c controls the second pump 300b.

FIG. 13 is a diagram showing a relationship between the flow rate set value per pump and the set amount of seawater, according to the configuration shown in FIG. 12. In FIG. 13, a solid line indicates an operating state of a pump, and a broken line indicates a stopped state of a pump.

As shown in FIG. 13, when the set amount of seawater is between ($F_1$) and ($F_2$), only the first pump 300a operates, and the flow rate set value of the first pump 300a gradually increases as the set amount of seawater increases from ($F_1$) to ($F_2$). When the set amount of seawater exceeds ($F_2$), then a second pump 300b also starts to operate. In this case, the flow rate set value of the first pump 300a decreases with the operation of the second pump 300b. As the set amount of seawater increases from ($F_2$) to ($F_3$), the flow rate set values in the first pump 300a and the second pump 300b progressively increase.

Furthermore, as the set amount of seawater decreases from ($F_3$), the flow rate set values in the first pump 300a and the second pump 300b progressively decrease. When the set amount of seawater decreases below (F2), then the second pump 300b stops operating. In this case, the flow rate set value of the first pump 300a increases with the stopping of operation of the second pump 300b.

The control of the plurality of pumps by an inverter, which is illustrated in FIG. 12 and FIG. 13, is effective in cases where the possible values of the set amount of seawater are set to a broad range, in other words, cases where the range of the engine load variation and the range of sulfur content of the fuel oil are set to broad ranges, or the like.

As described above, according to the amount-of-alkali control system of this kind, the alkali content required to absorb the sulfur oxides (in particular, sulfur dioxide ($SO_2$)) contained in the consumed heavy oil is calculated as a minimum amount of seawater, from the engine output and the sulfur content in the heavy oil used, and moreover, a corrected amount of seawater is calculated in such a manner that the sulfur oxide concentration contained in the processed exhaust gas which is discharged into the atmosphere from the scrubber 10 does not exceed the emission limit value, and an alkali injection amount to be injected into the seawater is calculated on the basis of the set amount of seawater obtained by summing together the minimum amount of seawater and the corrected amount of seawater.

By this configuration, it is possible to carry out alkali control of the seawater supplied to the scrubber, and therefore it is possible to achieve a highly reliable and stable removal rate of the sulfur oxides.

Furthermore, according to the alkali amount control system according to the second embodiment, it is possible to adjust and increase or decrease the alkali injection amount supplied to the scrubber 10, on the basis of the alkalinity set by the alkalinity setting device 81 and the alkalinity measurement device 82. Consequently, it is possible to make the alkali injection amount supplied to the scrubber 10 more appropriate, and the motive power of the alkali pump 340 can be reduced.

The present invention is not limited to the embodiments described above, and can be implemented with various modifications. In the embodiments described above, the invention is not limited to the sizes and shapes, and the like, depicted in the accompanying drawings, and appropriate modifications are possible within a range that exhibits the beneficial effects of the present invention. Apart from this, it is also possible to implement the invention by making appropriate modifications, without departing from the object of the invention.

For example, in the embodiments described above, a command is output from the emission ratio setting device 63 to the minimum-amount-of-seawater converter 61, but the output of this command may be omitted. In this case, it is envisaged that the amount of seawater is adjusted in the $SO_2$ concentration converter 66 by performing a calculation to change the set value (SV) of the outlet $SO_2$ concentration in accordance with the emission ratio from the emission ratio setting device 63. However, by outputting a command from the emission ratio setting device 63 to the minimum-amount-of-seawater converter 61 so as to correspond to the limit values for each traveled waters region, it is possible to facilitate the calculation of the amount of seawater and to reduce the burden involved in controlling the amount of seawater.

Furthermore, the traveled waters region for which the alkalinity is set by the alkalinity setting device 81 is not limited to the embodiments described above and may be changed. For example, in the embodiments described above, it is not necessary to set the alkalinity in respect of either waters where the standard seawater composition (TEOS-10) can be applied, or waters for which previously measured alkalinity data has been stored. In this case, it is chosen whether to set the alkalinity on the basis of the traveled waters information, or to start measurement by the alkalinity measurement device 82. However, including a determination of waters where the standard sweater composition (TEOS-10) can be applied is beneficial in enabling compatibility with the emission gas regulations of the IMO (International Maritime Organization), and making it possible to set the alkalinity for a plurality of traveled water regions is beneficial in enabling the frequency of alkalinity measurement to be reduced.

Furthermore, if the alkalinity setting device 81 has alkalinity data for all traveled water regions, then the alkalinity measurement device 82 and the measurement operation involving same can be omitted.

Moreover, the control of the amount of seawater in the present invention is carried out in a closed loop operation in waters where discharge of water is prohibited, when looped water is sampled to prevent precipitation of salt and seawater is used to replenish decrease in the looped water caused by scattering into the atmosphere, evaporation, etc.

The GPS 62 may be changed to another device or configuration, provided that the GPS measures the current location and outputs traveled waters information.

The invention claimed is:

1. An amount-of-seawater control device for controlling an amount of seawater supplied to a scrubber that cleans sulfur oxide contained in exhaust gas from an engine by bringing the sulfur oxide into contact with the seawater, the amount-of-seawater control device comprising:
   a minimum-amount-of-seawater converter configured to calculate a minimum amount of seawater necessary for an absorption reaction of the sulfur oxide by the seawater based on an output of the engine, a sulfur content of fuel oil, an alkalinity of the seawater set in accordance with waters traveled by a vehicle including the amount-of-seawater control device, and a limit value for a concentration of sulfur oxides in the exhaust gas, the limit value corresponding to the location of the waters traveled by the vehicle;
   an amount-of-seawater correction converter configured to calculate a corrected amount of seawater to apply to the minimum amount of seawater on the basis of a differential between the concentration of the sulfur oxide contained in the exhaust gas discharged into the atmosphere from the scrubber and a set value for the concentration of sulfur oxides determined from the limit value; and
   a pump control device which implements control of a seawater pump such that a set amount of seawater, corresponding to the minimum amount of seawater corrected by the corrected amount of seawater, is supplied to the scrubber.

2. The amount-of-seawater control device for a scrubber according to claim 1, further comprising:
   an alkalinity setting device configured to set an alkalinity of the seawater in accordance with the location information of the waters traveled by the vehicle,
   wherein the minimum-amount-of-seawater converter adjusts the amount of seawater supplied to the scrubber based on the alkalinity set by the alkalinity setting device.

3. The amount-of-seawater control device for a scrubber according to claim 2, wherein the alkalinity setting device stores alkalinity data of the seawater for a plurality of locations corresponding to waters traveled by the vehicle.

4. The amount-of-seawater control device for a scrubber according to claim 3, further comprising an electronic location determining system which measures a current location and outputs location information based on the current location measured by the electronic location determining system,
   wherein the alkalinity setting device sets the alkalinity on the basis of the location information, of waters traveled by the vehicle, output from the electronic location determining system.

5. The amount-of-seawater control device for a scrubber according to claim 4, further comprising an alkalinity measurement device configured to measure the alkalinity of the seawater,
   wherein the alkalinity setting device is configured to control the alkalinity measurement device to measure the alkalinity of ambient seawater in locations corresponding to waters traveled by the vehicle for which the alkalinity has not previously been stored.

6. The amount-of-seawater control device for a scrubber according to claim 5, further comprising an alkali coefficient converter configured to calculate an alkali coefficient corresponding to the location information of waters traveled by the vehicle, in response to a command from the alkalinity setting device, wherein the minimum-amount-of-seawater converter is configured to adjust the amount of seawater supplied to the scrubber on the basis of the alkali coefficient.

7. The amount-of-seawater control device for a scrubber according to claim 1, further comprising an emission ratio setting device configured to output a command to the minimum-amount-of-seawater converter so as to adjust the amount of seawater supplied to the scrubber in accordance with an emission ratio of sulfur dioxide to seawater.

8. The amount-of-seawater control device for a scrubber according to claim 1, further comprising a proportional-integral-derivative (PID) controller configured to implement PID control of a differential between a concentration of the sulfur oxide contained in the exhaust gas discharged into the atmosphere from the scrubber and the set value, and configured to supply an operation amount to the amount-of-seawater correction converter.

9. The amount-of-seawater control device for a scrubber according to claim 1, wherein the pump control device has a plurality of inverters and a pump flow rate setting device configured to start and stop operation of a pump by the plurality of inverters, and configured to change the flow rate of the pump, in accordance with the set amount of seawater.

10. The amount-of-seawater control device for a scrubber according to claim 2, further comprising an electronic location determining system which measures a current location and outputs the location information based on the current location measured by the electronic location determining system, wherein the alkalinity setting device sets the alkalinity on the basis of the location information, of waters traveled by the vehicle, output from the electronic location determining system.

11. The amount-of-seawater control device for a scrubber according to claim 10, further comprising an alkalinity measurement device configured to measure the alkalinity of the seawater, wherein the alkalinity setting device is configured to control the alkalinity measurement device to measure the alkalinity of ambient seawater in locations corresponding to waters traveled by the vehicle for which the alkalinity has not previously been stored.

12. The amount-of-seawater control device for a scrubber according to claim 2, further comprising an alkalinity measurement device configured to measure the alkalinity of the seawater, wherein the alkalinity setting device is configured to control the alkalinity measurement device to measure the alkalinity of ambient seawater in locations corresponding to waters traveled by the vehicle for which the alkalinity has not previously been stored.

13. The amount-of-seawater control device for a scrubber according to claim 2, further comprising an alkali coefficient converter configured to calculate an alkali coefficient corresponding to the location information of waters traveled by the vehicle, in response to a command from the alkalinity setting device, wherein the minimum-amount-of-seawater converter is configured to adjust the amount of seawater supplied to the scrubber on the basis of the alkali coefficient.

14. The amount-of-seawater control device for a scrubber according to claim 4, further comprising an alkali coefficient converter configured to calculate an alkali coefficient corresponding to the location information of waters traveled by the vehicle, in response to a command from the alkalinity setting device, wherein the minimum-amount-of-seawater converter is configured to adjust the amount of seawater supplied to the scrubber on the basis of the alkali coefficient.

15. An amount-of-seawater control method for a scrubber which controls an amount of seawater supplied to a scrubber that cleans sulfur oxide contained in exhaust gas by bringing the sulfur oxide into contact with seawater, the amount-of-seawater control method comprising:

calculating a minimum amount of seawater necessary for an absorption reaction of the sulfur oxide by the seawater based on an engine output, a sulfur content of fuel oil, an alkalinity of the seawater set in accordance with a location of waters through which a vehicle including the scrubber travels, and a limit value for a concentration of sulfur oxides in the exhaust gas, the limit value corresponding to the location of the waters traveled by the vehicle;

calculating a corrected amount of seawater to be applied to the minimum amount of seawater based on a differential between the concentration of the sulfur oxide contained in the exhaust gas discharged into the atmosphere from the scrubber and a set value for the concentration of sulfur oxides determined from the limit value;

correcting the minimum amount of seawater by the corrected amount of seawater to generate a set amount of seawater value; and controlling a pump such that the set value, corresponding to the minimum amount of seawater corrected by the corrected amount of seawater, is supplied to the scrubber.

16. An amount-of-alkali control device for a scrubber for controlling an amount of alkali injected into seawater supplied to a scrubber that cleans sulfur oxide contained in exhaust gas by bringing the sulfur oxide into contact with seawater, the amount-of-alkali control device comprising:

a minimum-amount-of-seawater converter configured to calculate a minimum amount of seawater necessary for an absorption reaction of the sulfur oxide by the seawater based on an engine output, a sulfur content of fuel oil, an alkalinity of the seawater set in accordance with waters traveled by a vehicle including the scrubber, and a limit value for a concentration of sulfur oxides in the exhaust gas, the limit value corresponding to the waters traveled by the vehicle;

an amount-of-seawater correction converter configured to calculate a corrected amount of seawater to be applied to the minimum amount of seawater on the basis of a differential between a concentration of the sulfur oxide contained in the exhaust gas discharged into the atmosphere from the scrubber and a set value for the concentration of sulfur oxides determined from the limit value;

a pump control device configured to control a pump to supply a set amount of seawater, corresponding to the minimum amount of seawater corrected by the corrected amount of seawater, to the scrubber;

an amount-of-alkali calculator configured to calculate an alkali injection amount from an alkali content contained in the set amount of seawater; and an alkali pump control device configured to control an alkali pump to inject into the seawater an alkali agent corresponding to the alkali injection amount prior to supplying the seawater to the scrubber.

17. The amount-of-alkali control device according to claim 16,
wherein the scrubber is configured to supply recycled seawater obtained by recycling seawater which has been used for cleaning, and fresh seawater which has not been used for cleaning, and
the amount-of-alkali control device further comprises a summing and subtracting element configured to calculate an amount of seawater corresponding to a differential obtained by subtracting an amount of fresh seawater from the set amount of seawater, and the amount-of-alkali calculator is configured to calculate an alkali injection amount from an alkali content contained in seawater of the amount of seawater corresponding to the differential.

18. The amount-of-alkali control device according to claim 16, further comprising:
an alkalinity setting device configured to set an alkalinity of the seawater in accordance with the location information of the waters traveled by the vehicle; and
an alkalinity measurement device configured to measure the alkalinity of the seawater,
wherein the minimum-amount-of-seawater converter adjusts the amount of seawater supplied to the scrubber based on the alkalinity set by the alkalinity setting device, and
the alkalinity setting device is configured to control the alkalinity measurement device to measure the alkalinity of the seawater for which the alkalinity has not been stored by the alkalinity setting device.

19. The amount-of-alkali control device according to claim 16, wherein the amount-of-alkali calculator is configured to calculate an alkali coefficient corresponding to the location of waters traveled by the vehicle, in response to a command from the alkalinity setting device, and configured to adjust the amount of seawater supplied to the scrubber on the basis of the alkali coefficient.

20. The amount-of-alkali control device according to claim 16, further comprising:
an alkalinity setting device configured to set an alkalinity of the seawater in accordance with the location of waters traveled by the vehicle,
wherein the amount-of-alkali calculator is configured to adjust an alkali injection amount on the basis of an alkalinity set by the alkalinity setting device.

* * * * *